US011282239B2

United States Patent
Han et al.

(10) Patent No.: US 11,282,239 B2
(45) Date of Patent: Mar. 22, 2022

(54) DEVICE AND METHOD OF TRANSMITTING POINT CLOUD DATA, DEVICE AND METHOD OF PROCESSING POINT CLOUD DATA

(71) Applicant: LG Electronics Inc., Seoul (KR)

(72) Inventors: Jaeshin Han, Seoul (KR); Hyejung Hur, Seoul (KR); Sejin Oh, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/143,783

(22) Filed: Jan. 7, 2021

(65) Prior Publication Data
US 2021/0209812 A1    Jul. 8, 2021

Related U.S. Application Data

(60) Provisional application No. 62/958,266, filed on Jan. 7, 2020.

(30) Foreign Application Priority Data

Mar. 23, 2020    (KR) .................... 10-2020-0034941

(51) Int. Cl.
*G06T 9/40*    (2006.01)
*G06T 3/40*    (2006.01)
(Continued)

(52) U.S. Cl.
CPC ............... *G06T 9/40* (2013.01); *G06T 3/40* (2013.01); *H04N 19/1883* (2014.11);
(Continued)

(58) Field of Classification Search
CPC .. G06T 9/00; G06T 3/40; G06T 9/001; G06T 9/40; H04L 65/1006; H04L 65/1069;
(Continued)

(56) References Cited

U.S. PATENT DOCUMENTS 7,843,450 B2*   11/2010   Chang .................. G01B 21/045
                                                       345/420
8,199,977 B2*    6/2012   Krishnaswamy ......... G06T 7/50
                                                       382/106
(Continued)

FOREIGN PATENT DOCUMENTS

KR      20190082065 A  *  7/2019  ............. G01S 17/89
WO   WO-2019065297 A1  *  4/2019  ............. H04N 19/96
(Continued)

OTHER PUBLICATIONS

Antoine Dricot et al., "Hybrid Octree-Plane Point Cloud Geometry Coding", European signal Processing , 2019 (Year: 2019).*
(Continued)

*Primary Examiner* — Mekonen T Bekele
(74) *Attorney, Agent, or Firm* — Fish & Richardson P.C.

(57) ABSTRACT

Disclosed herein are a point cloud data transmission method including encoding point cloud data, and transmitting a bitstream containing the point cloud data, and a point cloud data processing method including receiving a bitstream containing point cloud data, and decoding the point cloud data.

14 Claims, 25 Drawing Sheets

(51) Int. Cl.
  *H04N 19/96* (2014.01)
  *H04N 19/169* (2014.01)
  *H04N 19/46* (2014.01)
  *H04N 19/597* (2014.01)
  *H04N 19/64* (2014.01)

(52) U.S. Cl.
  CPC ........... *H04N 19/46* (2014.11); *H04N 19/597* (2014.11); *H04N 19/64* (2014.11); *H04N 19/96* (2014.11)

(58) Field of Classification Search
  CPC ..... H04L 65/607; H04L 65/608; H04L 65/80; H04L 67/38; H04N 19/597; H04N 19/70; H04N 21/6437; H04N 19/103; H04N 19/1883; H04N 19/46; H04N 19/61; H04N 19/63; H04N 19/64; H04N 19/96
  See application file for complete search history.

(56) References Cited

U.S. PATENT DOCUMENTS

| | | | | |
|---|---|---|---|---|
| 8,731,313 | B2* | 5/2014 | Thiyanaratnam | G06T 9/00 382/240 |
| 10,861,196 | B2* | 12/2020 | Mammou | G06T 17/005 |
| 11,057,645 | B2* | 7/2021 | Hur | H04N 19/132 |
| 2014/0098854 | A1* | 4/2014 | Gu | H04N 19/593 375/240.03 |
| 2016/0086353 | A1* | 3/2016 | Lukac | G06T 9/00 345/419 |
| 2019/0081638 | A1* | 3/2019 | Mammou | H03M 7/6064 |
| 2019/0355152 | A1* | 11/2019 | Li | G06T 3/4084 |
| 2019/0387212 | A1* | 12/2019 | Oh | G06T 3/0018 |
| 2020/0250857 | A1* | 8/2020 | Nakagami | G06T 9/004 |
| 2021/0021664 | A1* | 1/2021 | Oyman | H04L 65/1006 |

FOREIGN PATENT DOCUMENTS

| | | |
|---|---|---|
| WO | WO2019069711 | 4/2019 |
| WO | WO2019070952 | 4/2019 |
| WO | WO2019078000 | 4/2019 |
| WO | WO2019140508 | 7/2019 |

OTHER PUBLICATIONS

Mammou et al., "G-PCC codec description v2," International Organisation for Standardisation Organisation Internationale De Normalisation ISO/IEC JTC1/SC29/WG11 (Year: 2019).*

3DG, "G-PCC codec description v2," International Organisation for Standardisation Organisation Internationale De Normalisation, ISO/IEC JTC1/SC29/WG11, N18189, Marrakech, MA, dated Jan. 2019, 40 pages.

PCT International Search Report and Written Opinion in International Appln. No. PCT/KR2021/000063, dated Apr. 22, 2021, 20 pages (with English translation).

* cited by examiner

FIG. 7
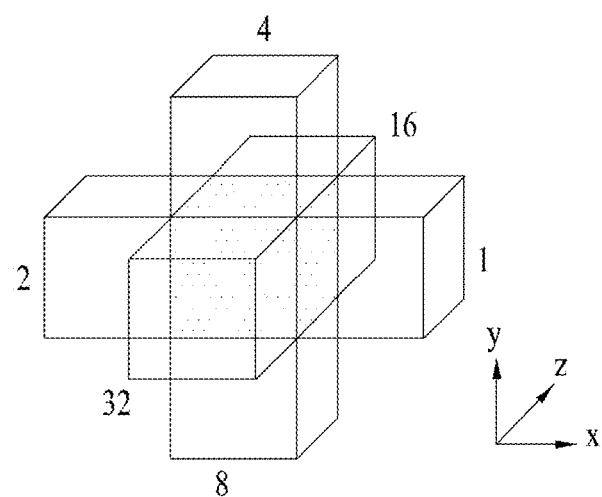
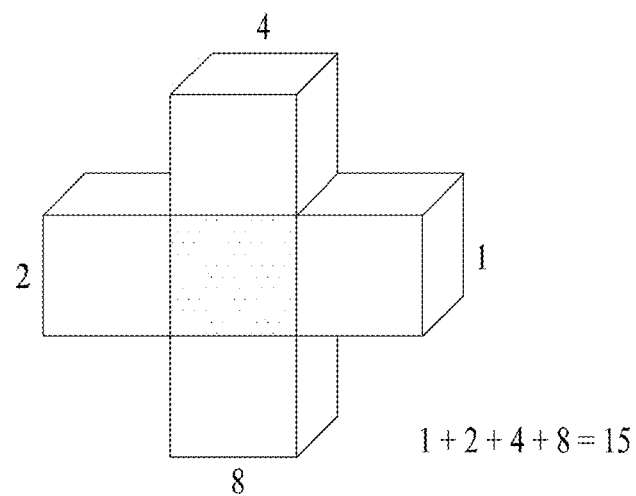
1+2+4+8=15

FIG. 18

```
seq_parameter_set( ) {
    profile_compatability_flags
    level_idc
    sps_bounding_box_present_flag
    if( sps_bounding_box_present_flag ) {
        sps_bounding_box_offset_x
        sps_bounding_box_offset_y
        sps_bounding_box_offset_z
        sps_bounding_box_scale_factor
        sps_bounding_box_size_width
        sps_bounding_box_size_height
        sps_bounding_box_size_depth
    }
    sps_source_scale_factor
    sps_seq_parameter_set_id
    sps_num_attribute_sets
    for( i=0; i<sps_num_attribute_sets; i++) {
        attribute_dimension[i]
        attribute_instance_id[i]
        attribute_bitdepth[i]
        attribute_cicp_colour_primmaries[i]
        attribute_cicp_transfer_characteristics[i]
        attribute_cicp_matrix_coeffs[i]
        attribute_cicp_video_full_range_flag[i]
        attribute_correlated_weight_flag
        attribute_correlated_weight_method
        known_attribute_label_flag[i]
        if( known_attribute_label_flag[i] )
            known_attribute_label[i]
        else
            attribute_label_four_bytes[i]
    }
    sps_extension_present_flag
    if( sps_extension_present_flag )
        while( more_data_in_byte_stream( ) )
            sps_extension_data_flag
    byte_alignment( )
}
```

FIG. 19

```
attribute_parameter_set( ) {
    aps_attr_parameter_set_id
    aps_seq_parameter_set_id
    attr_coding_type
    aps_attr_initial_qp
    aps_attr_chroma_qp_offset
    aps_slice_qp_delta_present_flag
    aps_correlated_weight_flag
    aps_correlated_weight_method
    isLifting = ( attr_coding_type = = 0 | | attr_coding_type = = 2 ) ? 1 : 0
    if ( isLifting ) {
        lifting_num_pred_nearest_neighbours
        lifting_max_num_direct_predictors
        lifting_search_range
        lifting_lod_regular_sampling_enabled_flag
        lifting_num_detail_levels_minus1
        for( idx = 0; idx <= num_detail_levels_minus1; idx ++ ) {
            if ( lifting_lod_decimation_enabled_flag )
                lifting_sampling_period[ idx ]
            else
                lifting_sampling_distance_squared[ idx ]
        }
    }
    if( attr_coding_type = = 0 )
        lifting_adaptive_prediction_threshold
        lifting_intra_lod_prediction_num_layers
    }
    aps_extension_present_flag
    if( aps_extension_present_flag )
        while( more_data_in_byte_stream( ) )
            aps_extension_data_flag
    byte_alignment( )
}
```

FIG. 20

```
//pd: point distance
weighted_sum = alpha*pd0 + beta*pd1 + gamma*pd2;
w2 = alpha*pd0 / weighted_sum;
w1 = beta*pd1 / weighted_sum;
w0 = reference_power - (w1 + w2);
```

```
//pd: point distance
weighted_sum = pd0 + pd1 + pd2;
w2 = reference_power*(pd0 / weighted_sum);
w1 = reference_power*(pd1 / weighted_sum);
w0 = reference_power - (w1 + w2);
```

```
//pd: point distance
weighted_sum = pd0*pd0 + pd1*pd1 + pd2*pd2;
w2 = pd0*pd0 / weighted_sum;
w1 = pd1*pd1 / weighted_sum;
w0 = reference_power - (w1 + w2);
```

```
//pd: point distance
weighted_sum = pd0+pd0 + pd1+pd1 + pd2+pd2;
w2 = pd0+pd0 / weighted_sum;
w1 = pd1+pd1 / weighted_sum;
w0 = reference_power - (w1 + w2);
```

DEVICE AND METHOD OF TRANSMITTING POINT CLOUD DATA, DEVICE AND METHOD OF PROCESSING POINT CLOUD DATA

CROSS-REFERENCE TO RELATED APPLICATIONS

This application claims the benefit of U.S. Provisional Application No. 62/958,266, filed on Jan. 7, 2020, and Korean Patent Application No. 10-2020-0034941, filed on Mar. 23, 2020, which is hereby incorporated by reference as if fully set forth herein.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, in some embodiments, a method for transmitting point cloud data according to some embodiments may include: encoding the point cloud data including geometry and attribute, the geometry representing positions of points of the point cloud data, the attribute including at least one of colors and reflectance of the points. In some embodiments, the encoding the point cloud data includes encoding the geometry and encoding the attribute based on complete or partial octree of the encoded geometry. In some embodiments, the attribute is encoded based on quantization weight of a point that is included an LOD (Level Of Detail) of one or more LODs. In some embodiments, the quantization weight is derived based on a number of the points and a number of points that belong to a level that is represented by the LOD. In some embodiments, the method of transmitting the point cloud data further includes transmitting a bitstream including the encoded point cloud data encoding the point cloud data, and transmitting a bitstream containing the point cloud data.

In some embodiments, a method for processing point cloud data may include receiving a bitstream including the point cloud data and signaling information and decoding the point cloud data based on the signaling information. In some embodiments, decoding the point cloud data includes decoding geometry included in the point cloud data, the geometry representing positions of points of the point cloud data and decoding attribute, that includes at least one of colors and reflectance of the points, based on complete or partial octree of the decoded geometry. In some embodiments, the attribute is decoded based on quantization weight of a point that is included an LOD (Level Of Detail) of one or more LODs. In some embodiments, the quantization weight is derived based on a number of the points and a number of points that belong to a level that is represented by the LOD.

In some embodiments, a device of processing point cloud data includes a receiver to receive a bitstream including the point cloud data and signaling information and a decoder to decode the point cloud data based on the signaling information. In some embodiments, the decoder further includes a geometry decoder to decode geometry included in the point cloud data and an attribute decoder to decode attribute, that includes at least one of colors and reflectance of the points based on complete or partial octree of the decoded geometry. In some embodiments, the geometry represents positions of points of the point cloud data. In some embodiments, the attribute is decoded based on quantization weight of a point that is included an LOD (Level Of Detail) of one or more LODs. In some embodiments, the quantization weight is derived based on a number of the points and a number of points that belong to a level that is represented by the LOD.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 18 shows an example of signaling information according to embodiments;

FIG. 19 illustrates an example of signaling information according to embodiments;

FIG. 20 illustrates a method of encoding correlated weights according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
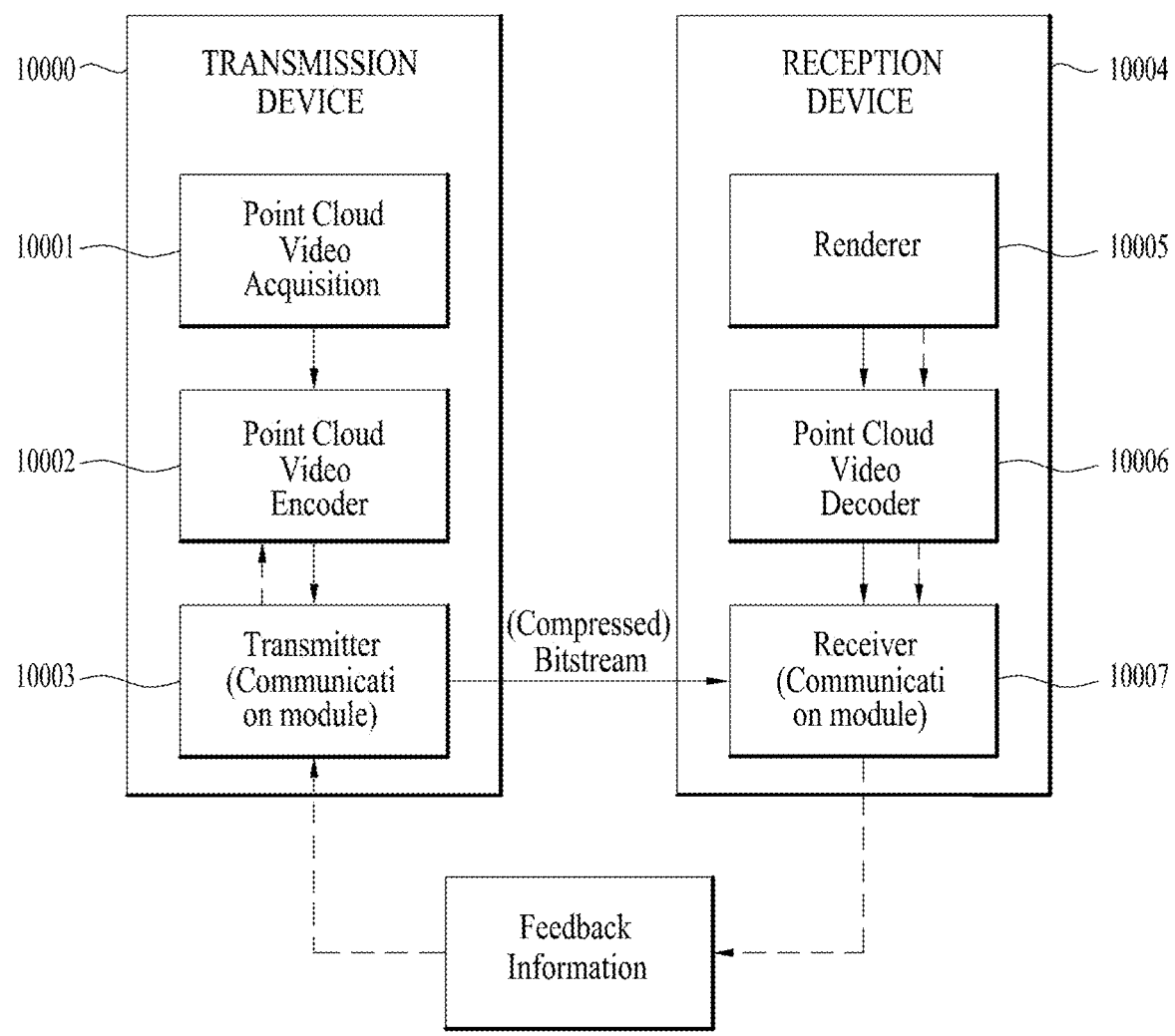
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
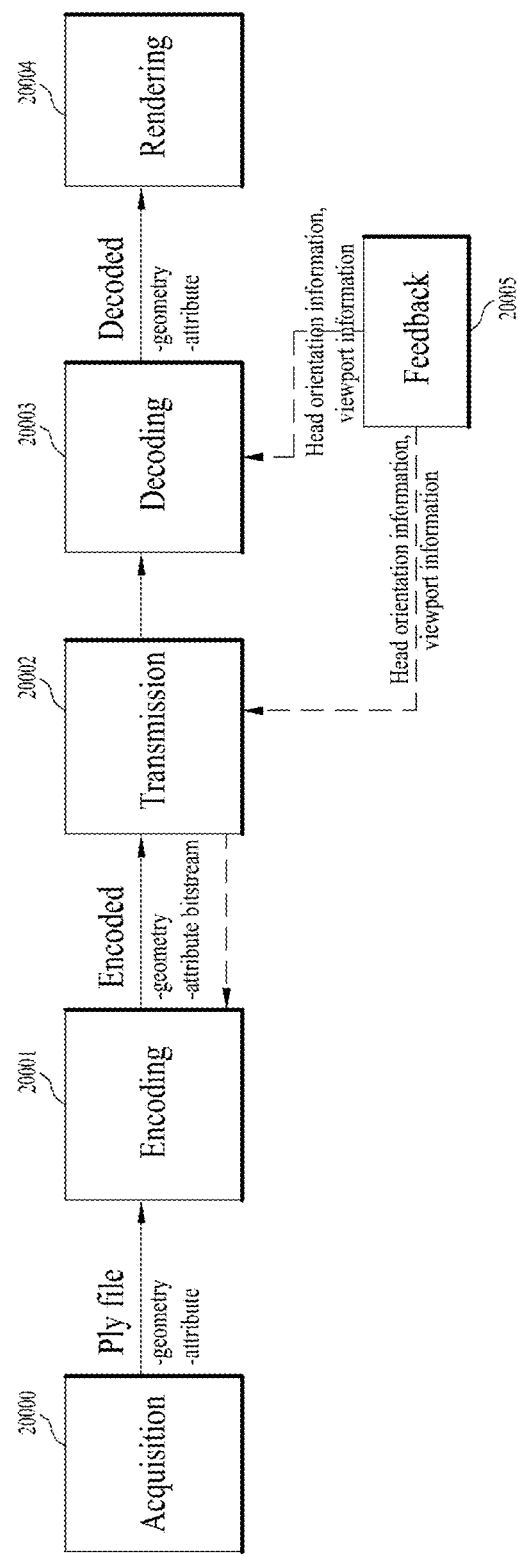
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
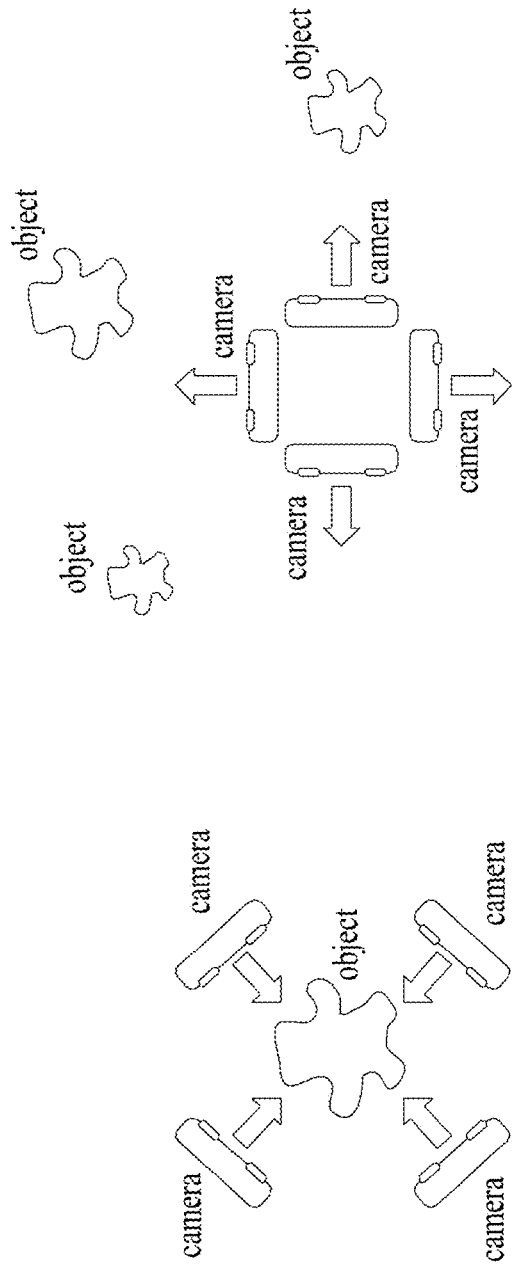
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
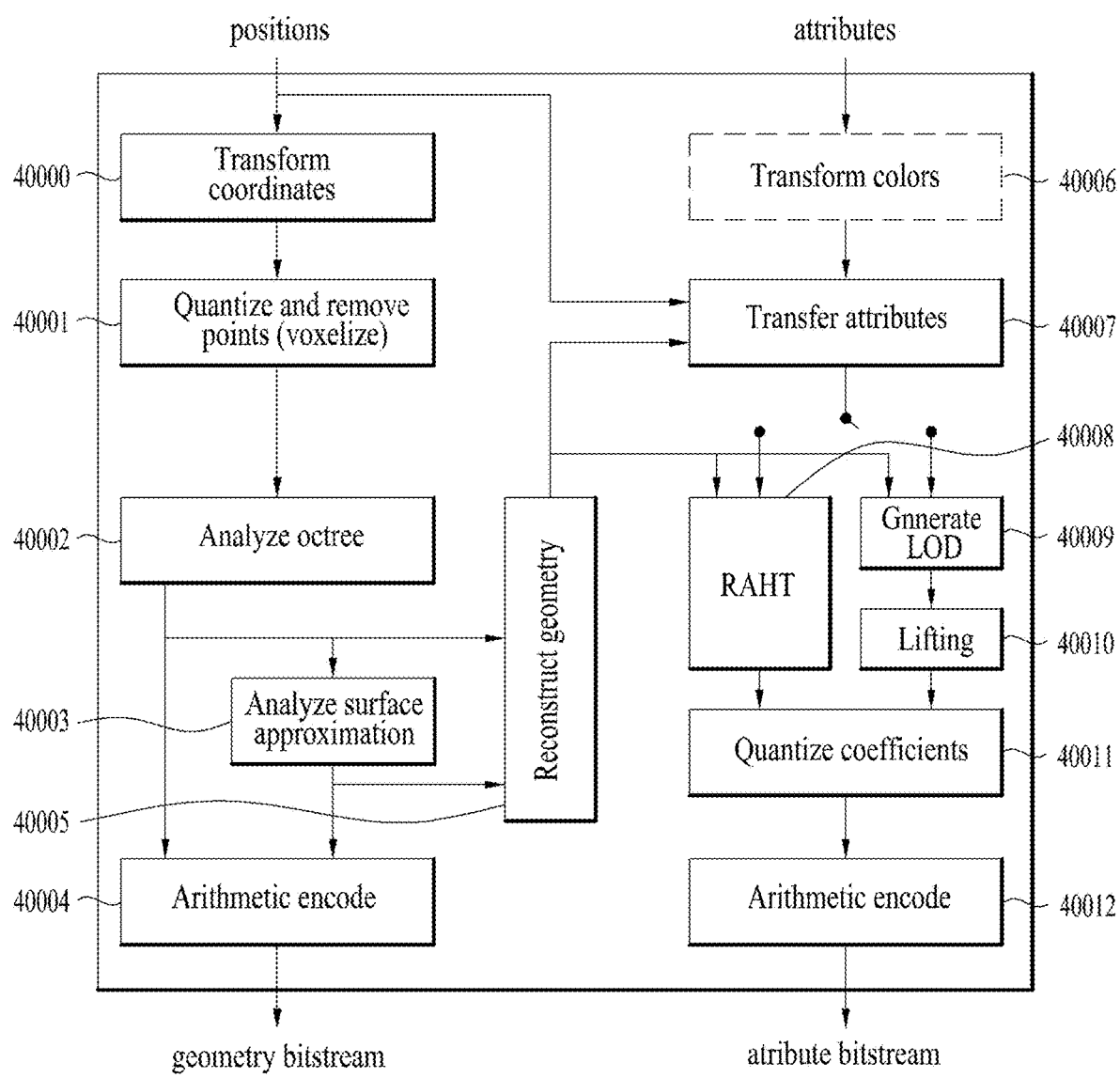
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
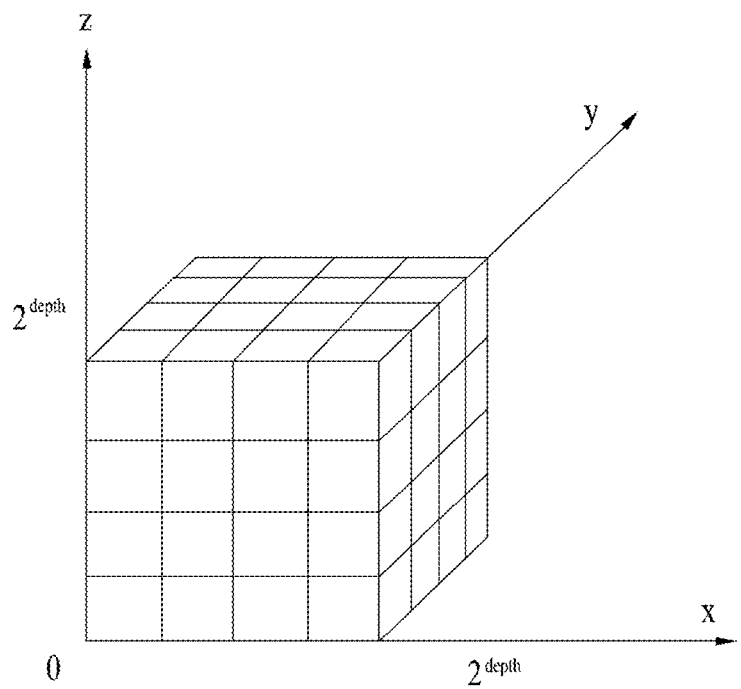
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
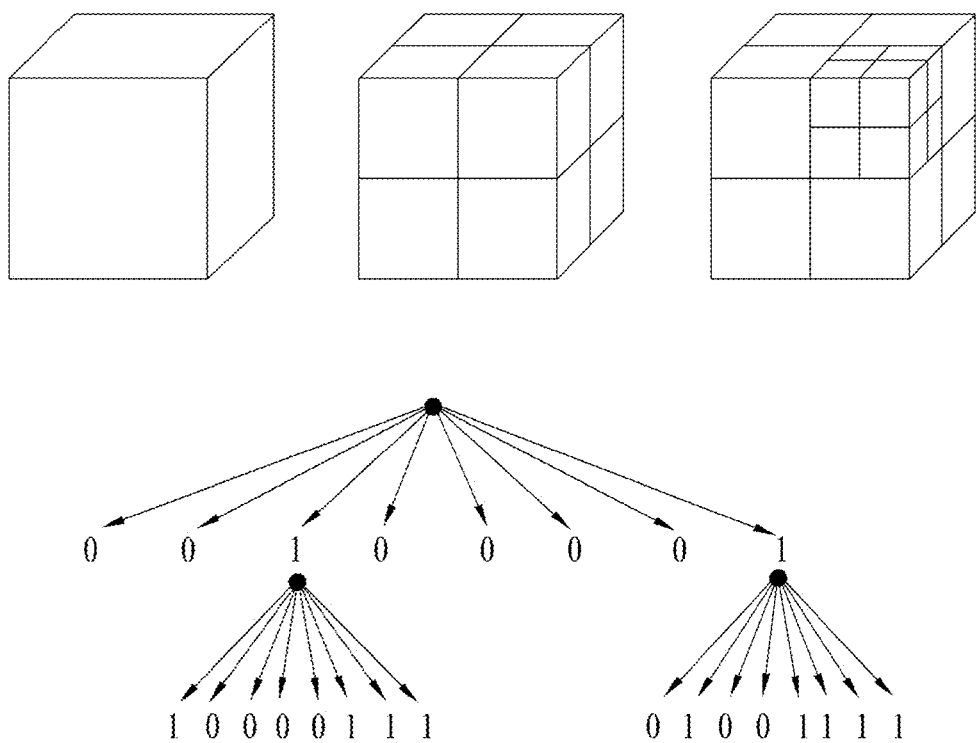
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d, 2^d, 2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x^{int}_n, y^{int}_n, z^{int}_n, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$

$$\text{ii)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4,1) |
| 5 | (1, 2, 3), (3, 4, 5), (5, 1, 3) |
| 6 | (1, 2, 3), (3, 4, 5), (5, 6, 1), (1, 3, 5) |

TABLE 2-1-continued

Triangles formed from vertices ordered 1, . . . , n

| n | triangles |
|---|---|
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
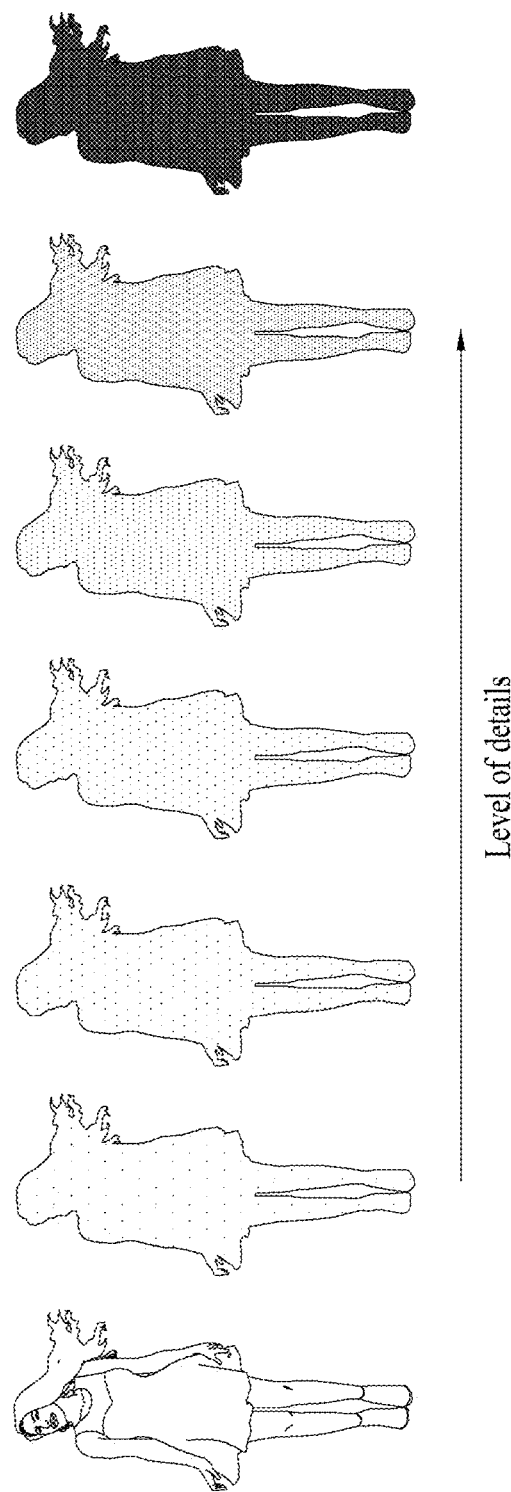
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
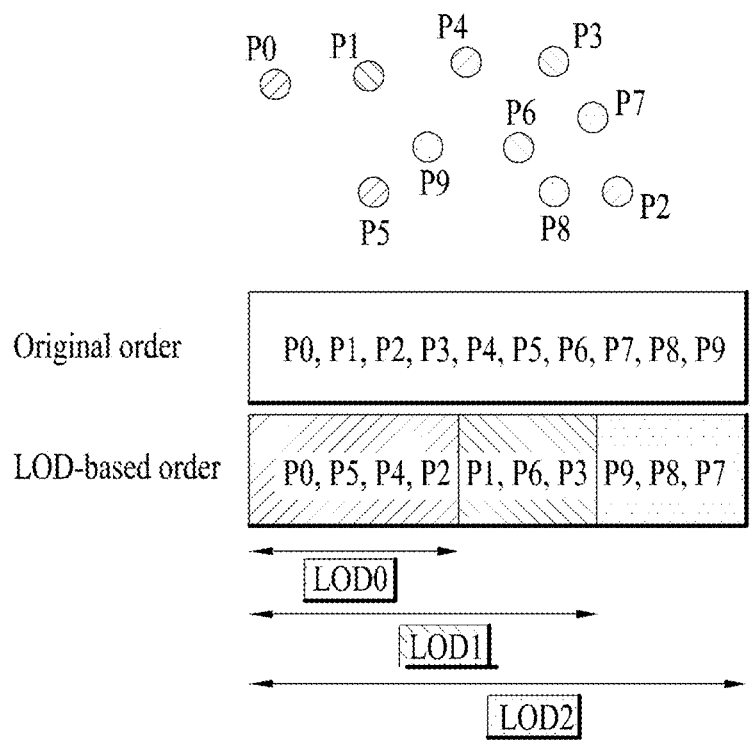
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD 1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE

Attribute prediction residuals inverse quantization pseudo code

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ h_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{l_{0,0,0}}$ and $g_{l_{0,0,1}}$ as follows.

$$\begin{bmatrix} gDC \\ h_{0_{0,0,0}} \end{bmatrix} = T_{w1000w1001} \begin{bmatrix} g_{l_{0,0,0z}} \\ h_{l_{0,0,1}} \end{bmatrix}$$

The value of gDC is also quantized and subjected to entropy coding like the high-pass coefficients.

Figure 10:
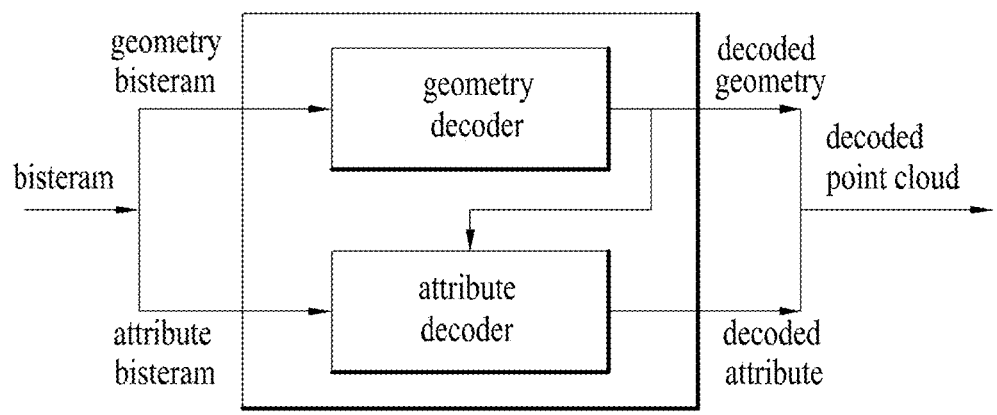
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
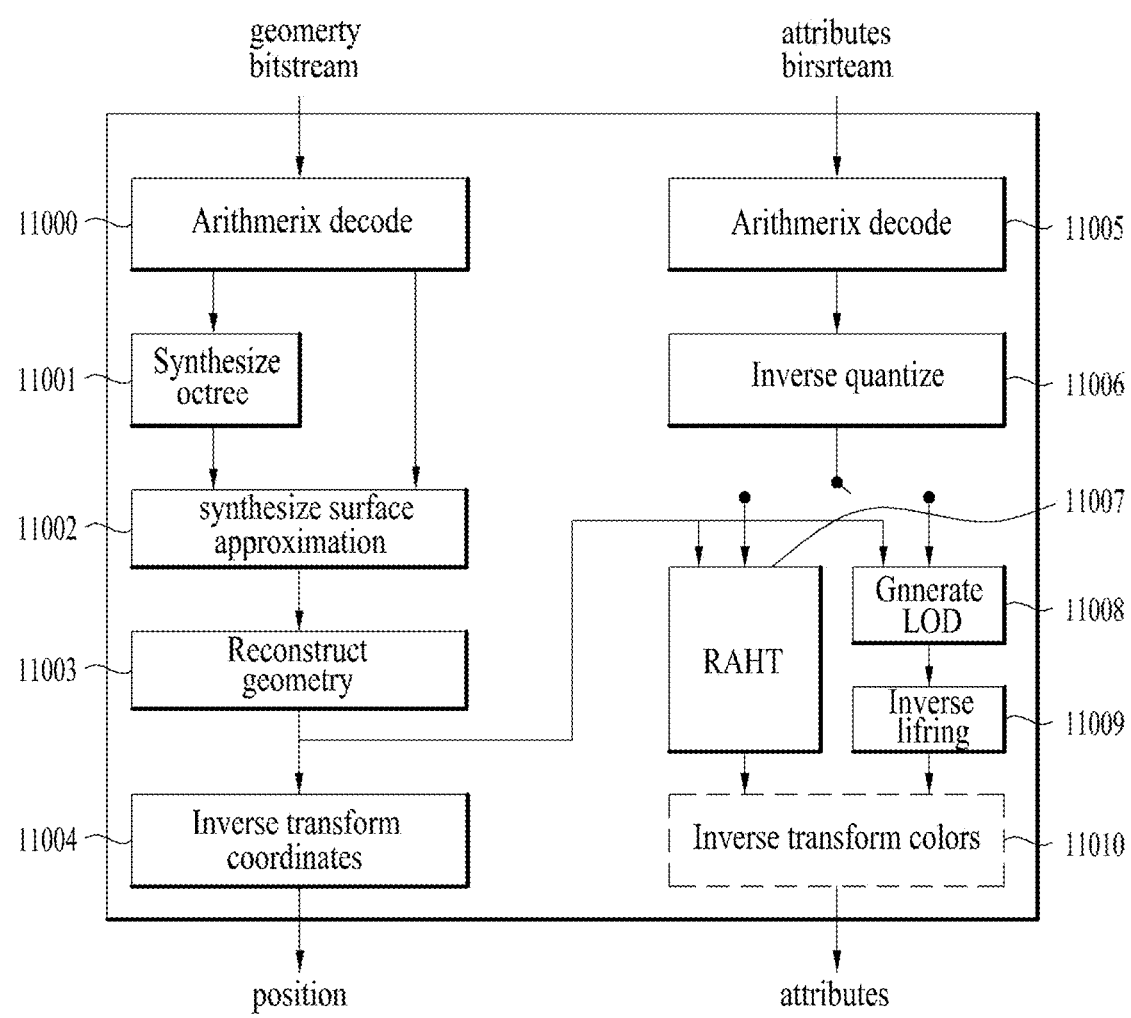
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
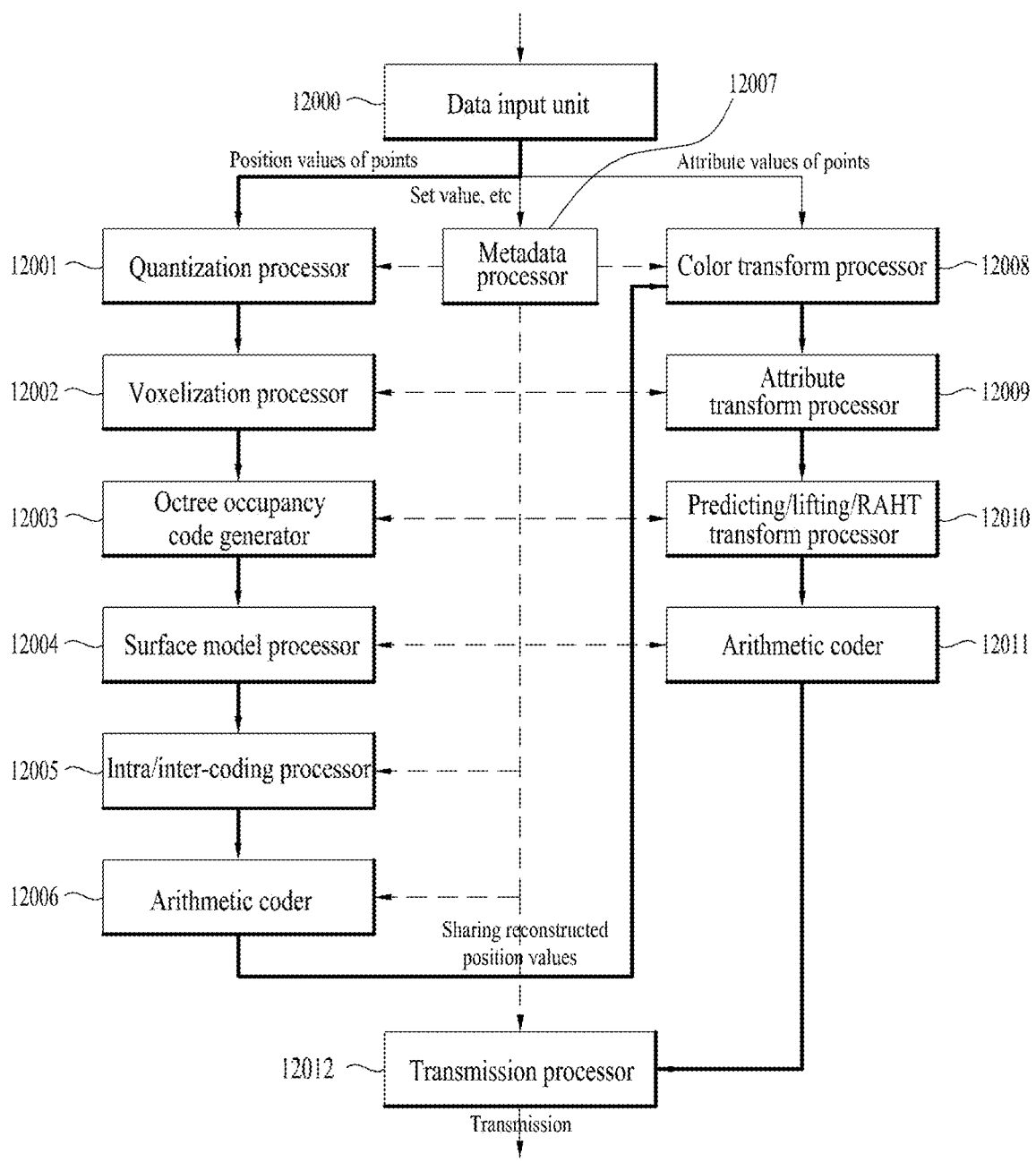
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
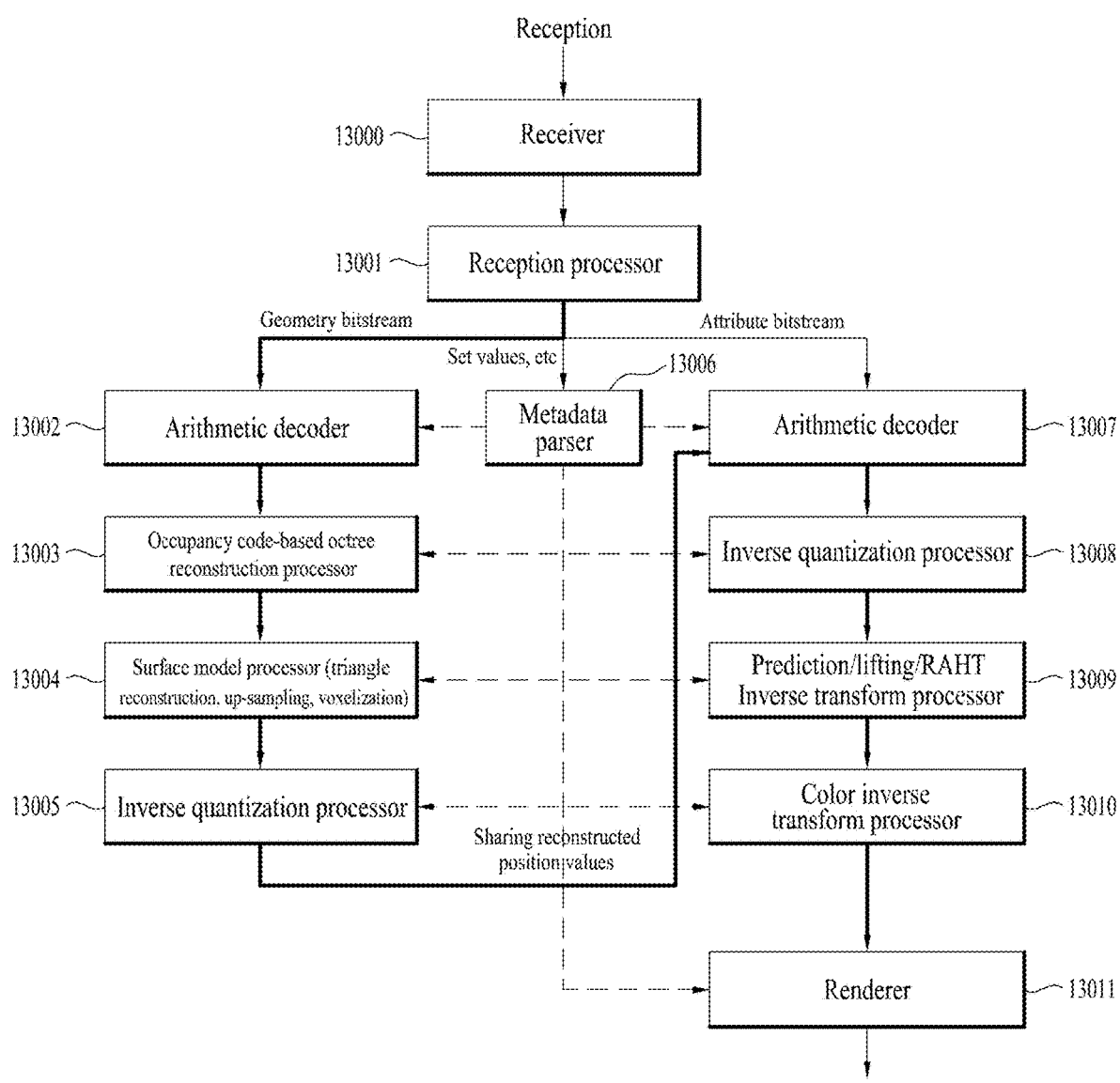
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
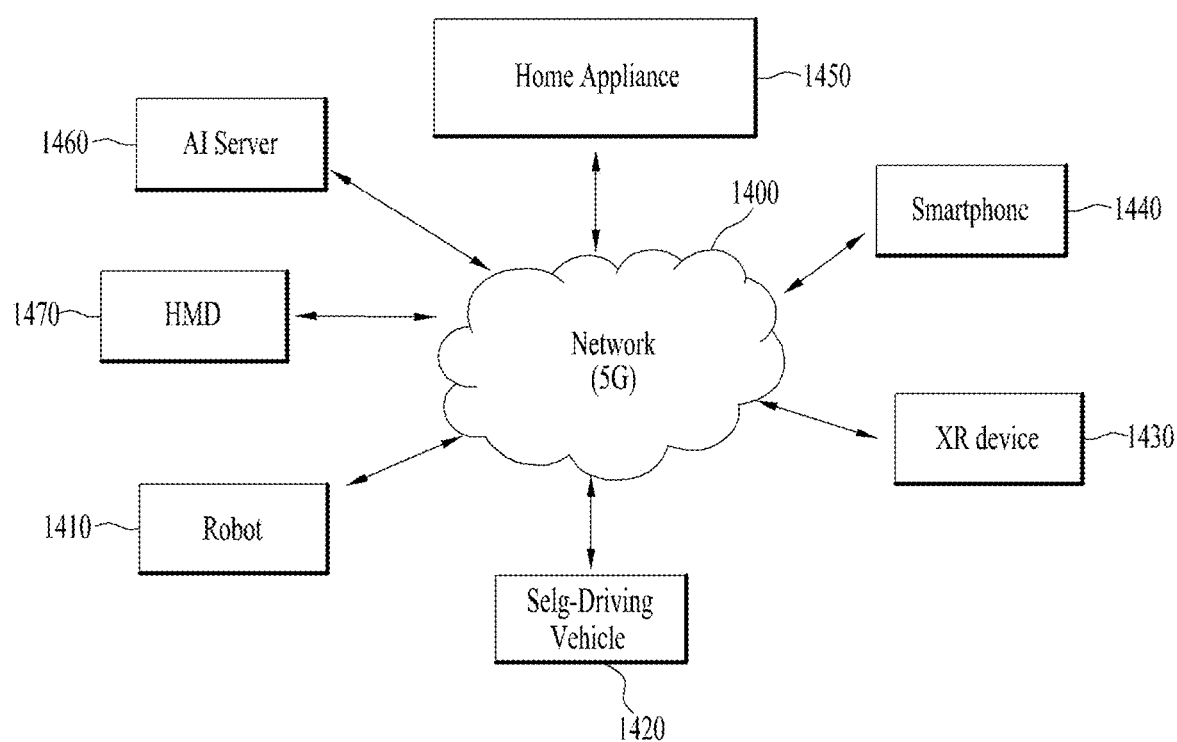
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud processing device (for example, the transmission device or the point cloud encoder described in FIGS. 1, 12, and 14) according to the embodiments performs attribute encoding selectively using RAHT coding, predicting transform coding, and lifting transform coding, or a combination of one or more of the coding techniques according to the point cloud content. For example, RAHT coding and lifting transform coding may be used for lossy coding, which compresses point cloud content data to a significant degree. The predicting transform coding may be used for lossless coding.

As described above, the point cloud encoder according to the embodiments may generate a predictor for a point and perform predicting transform coding to set a predicted attribute (or predicted attribute value) of each point. According to embodiments, the predicting transform coding and lifting transform coding calculate a distance (or position) of each neighbor point based on the position of a point (hereinafter referred to as a target point) stored within a neighboring range of a point cloud. The calculated distance is used as a reference or reference weight to predict an attribute (e.g., color, reflectance, etc.) of the target point or to update the attribute (or predicted attribute) of the target point when the distance to the neighbor point is changed. The following equation represents an attribute of the target point predicted based on neighbor points.

$$P = \frac{[(d_2 d_3) \ll \text{shift}]C_1}{d_1 d_2 + d_2 d_3 + d_3 d_1} + \frac{[(d_3 d_1) \ll \text{shift}]C_2}{d_1 d_2 + d_2 d_3 + d_3 d_1} + \ldots \quad \text{[Equation 1]}$$

In the equation above, P denotes the predicted attribute of the target point, and d1, d2, and d3 denote the distances to each of the three neighbor points of the target point. The respective distances are combined and used as a reference weight. C1, C2, and C3 (not shown in the equation) denote the attributes of the respective neighbor points. Shift is a parameter used to adjust the magnitude of the average energy or power of the points. The value of shift is controlled by the hardware voltage operating range of the encoder or decoder.

According to embodiments, the point cloud encoder may change the above-described reference weight in consideration of a correlation between points (e.g., neighbor points). In particular, the point cloud encoder uses a correlated weight calculated by changing the above-described reference weight according to a correlation combining method in order to highlight the characteristic value at the distances to the neighbor points of the target point. Accordingly, the point cloud encoder may secure a performance gain proportional to the correlation between points. In addition, the point cloud encoder may generate a predictor in consideration of a correlation degree without changing the structures of RAHT coding, predicting transform coding, and lifting transform coding described with reference to FIGS. 1 to 14.

Figure 15:
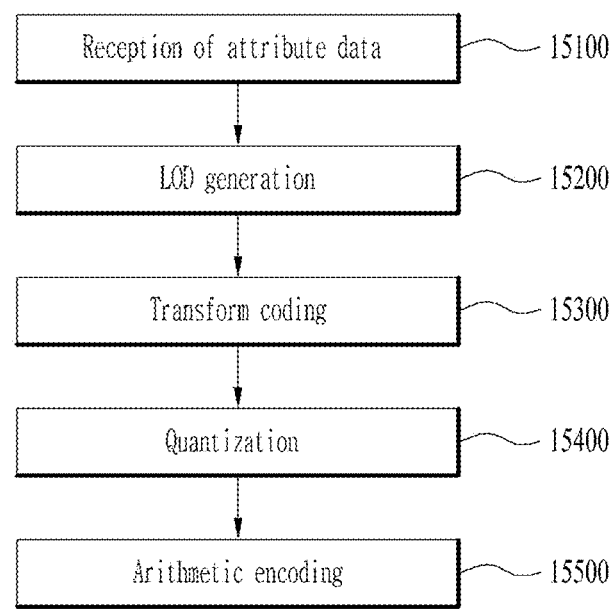
FIG. 15 is a flow diagram illustrating an example of point cloud encoding.

FIG. 15 is a flow diagram illustrating an example of point cloud encoding.

As described with reference to FIGS. 1 to 14, the point cloud transmission device or the point cloud encoder (for example, the point cloud encoder described in FIG. 4) receives an attribute (15100).

The point cloud encoder (e.g., the LOD generator 4009) generates an LOD to perform predicting transform (15200). The point cloud encoder reorganizes points into refinement levels to generate an LOD. Accordingly, a greater level value of the LOD indicates that the point cloud content is more detailed. According to embodiments, the LOD may include points grouped based on a distance between points. The point cloud encoder reorganizes the points based on the octree structure. An iteration generation algorithm that may be applied to octree decoding according to the positions of points or the order of the points (e.g., Morton code order, etc.) is applied to the grouped points. In each iteration sequence, one or more refinement levels, RO, R1, . . . , Ri belonging to one LOD (e.g., LODi) are generated. That is, the level of the LOD is a combination of refinement levels.

In addition, the point cloud encoder described with reference to FIGS. 1 to 14 supports spatial scalability decoding. According to embodiments, the spatial scalability decoding is decoding performed on some or all of the geometry and/or attributes so as to provide point cloud content of various resolutions according to decoding performance of the point cloud reception device (e.g., the reception device 10004 of FIG. 1, the point cloud decoder of FIGS. 10 and 11, and the reception device of FIG. 13). The spatial scalability decoding includes at least one of scalable geometry decoding for geometry and scalable attribute decoding for attributes. The scalable attribute decoding includes at least one of the RAHT coding, predicting transform coding, and lifting transform coding described above. Accordingly, the point cloud encoder may perform attribute encoding to allow the point cloud reception device (the point cloud decoder described with reference to FIGS. 10 to 11, the reception device described with reference to FIG. 13, etc.) to perform scalable attribute decoding. The LOD for supporting spatial scalability decoding may be generated by searching for neighbor points using the method of approximate nearest neighbor search for points from the lowest point to the highest point in the octree structure. The nearest neighbor points of the corresponding point in the current LOD are searched for from an LOD (e.g. LOD1-1) at a level lower than the level of the current LOD (e.g. LODI). The LOD at a lower level than the current LOD is a combination of refinement levels of R0, R1, . . . , and R1-1.

The specific LOD generation algorithm is configured as follows. According to embodiments, $(P_i)_{i=1 \ldots N}$ is referred to as a set of positions associated with point cloud points. According to embodiments, $(M_i)_{i=1 \ldots N}$ is Morton codes associated with the set of positions. Parameters $D_0$ and $\rho$ are defined as an initial sampling distance and a distance ratio between LODs, respectively. The distance ratio is always greater than 1 ($\rho > 1$).

According to embodiments, the points are arranged in ascending order according to the Morton code values of the points. According to embodiments, a parameter/denotes an array of point indexes sorted according to the above-described process. The LOD generation algorithm is performed iteratively. In each iteration k, points belonging to LOD k are extracted, and predictors of the extracted points are generated starting from k equal to 0 until all points are allocated to LODs. A more detailed process is described below.

The sampling distance D is initialized to the initial sampling distance $D_0$. In iteration k, which ranges from 0 to the number of LODs, L(k) is an index set of points belonging to the k-th LOD, and O(k) is a set of points belonging to the LODs corresponding to a level higher than k. After L(k) and O(k) are initialized, the LOD allocation and residual of the points are calculated iteratively and input sequentially. This process is repeated across all the indexes in the array I. Here, L(k) and O(k) may be calculated and used in a process for generating predictors associated with the points of L(k). According to embodiments, R(k) is a set of points that need to be added to LOD(k−1) in order to secure LOD(k), and is expressed as follows.

R(k)=L(k)\L(k−1), where "\" is a difference operator.

For each point i in R(k), an algorithm to find h neighbor points of point i in O(k) and calculate a normal distance and a correlated linear distance associated with point i is configured as follows. According to embodiments, h, which is a parameter defined by a user, represents a constant for adjusting the maximum number of neighbor points used for prediction of point i.

The counter j is initialized to zero (j=0).

For point i in R(k), Mi denotes a Morton code associated with point i. Mj denotes a Morton code associated with the j-th element in O(k).

When Mi is greater than or equal to Mj, and j is less than the size of O(k) ($M_i \geq M_j$ and j<SizeOf(O(k))), the counter j is incremented by 1 (j←j+1) and the distance between Mi and the points associated with an index in O(k) is measured. The points are within a specific search range [j−SR2, j+SR2], and h nearest neighbor points $((n_1, n_2, \ldots, n_h))$ and a normal distance between each neighbor point and point i $(d_{n_1}^2(i), d_{n_2}^2(i) \ldots, d_{n_h}^2(i))$ is tracked.

In addition, based on the normal distances, correlated squared distances between two nearest squared distances are calculated. The correlated squared distances may be represented as follows.

$$(d_{n1}(i)+d_{n2}(i))(d_{n1}(i)+d_{n2}(i)),(d_{n1}(i)+d_{n3}(i))(d_{n2}(i)+d_{n3}(i))\ldots,(d_{n_{h\_1}}(i)+d_{n_h}(i))(d_{n_{h\_1}}(i)+d_{n_{h\_1}}(i))$$

The calculation method is not limited to the above-described example.

When the correlated squared distance between the target point and the last processed point is less than a threshold, the neighbor points of the last processed point are used for initial estimation and search. According to embodiments, the threshold may be defined by a user. Points having a correlated squared distance greater than the threshold are excluded.

The LOD generation algorithm is also applied to the point cloud reception device (e.g., the point cloud decoder and reception device described with reference to FIGS. 10, 11 and 13). Accordingly, the point cloud reception device generates an LOD based on the above-described LOD generation algorithm.

The point cloud encoder performs transform coding (15300). As described with reference to FIGS. 1 to 14, the point cloud encoder according to the embodiments selectively uses RAHT coding, predicting transform coding, and lifting transform coding, or a combination of one or more the coding techniques according to the point cloud content.

According to embodiments, the predicting transform coding includes interpolation based prediction. The attributes associated with the point cloud are encoded and decoded in an order defined according to the LOD generation process. In each operation, only points that have already been encoded or decoded are considered for prediction. The attribute of a point is predicted based on the weighted average of the attributes (or attribute values) of neighbor points of the point. However, points in the neighbor point group may be distributed near or far away from the point. Accordingly, when a greater weight is assigned to the points that are densely distributed than to the points that are less densely distributed or distributed far away from the point, the actual correlation between the points may be reflected, and therefore predicted attributes may be calculated more accurately. Accordingly, the attribute (or attribute value) of the point according to the embodiments may be predicted based on the distance to the nearest neighbor points of the point as well as the interpolation based prediction (or interpolation prediction transform process) which uses weights.

According to embodiments, $(a_i)_{i\in 0 \ldots k-1}$ denotes attributes (or attribute values). $N_i$ denotes a set of k nearest neighbor points of a point. $(\tilde{a}_j)_{j\in N_i}$ is the j-th decoded and reconstructed attribute. The equation below represents a process of calculating correlated distances using a circular correlated shift matrix.

$$D = \begin{bmatrix} \mu_j \\ \mu_{j+1} \\ \mu_{j+2} \\ \mu_{j+3} \end{bmatrix} = \begin{bmatrix} 0 & 1 & 1 & 1 \\ 1 & 0 & 1 & 1 \\ 1 & 1 & 0 & 1 \\ 1 & 1 & 1 & 0 \end{bmatrix} \begin{bmatrix} \delta_j \\ \delta_{j+1} \\ \delta_{j+2} \\ \delta_{j+3} \end{bmatrix}$$ [Equation 2]

In the equation, $(\delta_j)_{j\in N_i}$ denotes the distances between a point and neighbor points thereof. $(\mu_j)_{j\in N_i}$ is a correlated distance (or referred to as a correlated value) calculated by applying the matrix. The weighted average predicted attribute (correlated weight) calculated based on the correlated distance $(\mu_j)_{j\in N_i}$ calculated in the equation above is expressed as follows.

$$\hat{a}_i = \text{Round}\left(\frac{1}{k}\sum_{j\in N_i}\frac{\frac{1}{\mu_j^2}}{\sum_{j\in N_i}\frac{1}{\mu_j^2}}\tilde{a}_j\right)$$ [Equation 3]

According to embodiments, lifting transform coding uses an update operator to calculate the predicted attribute of each point. The lifting transform coding calculates a predicted value and a residual value for a point belonging to the LOD in the highest level (e.g. LODn). The lifting transform coding may calculate a weight for the point. The update operator of the point may calculate the updated attribute value based on the calculated weight and the residual value. The calculated update attribute value is used to calculate a predicted attribute of a point in the next LOD (e.g., LOD n−1, which is one level lower than LODn). An LOD of a level includes points included in other LODs of higher levels. That is, since points included in a low-level LOD are more frequently used for prediction, LOD-based lifting transform coding has a greater influence on points belonging to the low-level LOD. Accordingly, the update operator may perform the update operation based on a weight updated by adding the weight of the neighbor points to the weight of the corresponding point.

According to embodiments, lifting transform coding may use an updated weight reflecting a correlation between neighbor points. The update operator performs an update operation based on the updated weight. Hereinafter, a process of updating a weight based on the correlation between neighbor points will be described. The updated weight reflecting the correlation between neighbor points may be referred to as a correlated weight.

w(P) is a weight associated with point p. w(P) is calculated using the following recursive operation.

The value of w(P) is defined as 1 for all points.

Points are traversed in inverse order of the order defined in the LOD structure.

For each point Q(i,j) belonging to the LOD(j), the weights of the neighbor points (P∈∇(Q(i,j))) of a point are updated. The following represents the update process.

$$w(P) \leftarrow w(P)+w(C[Q(i,j),j])\alpha(P,Q(i,j))$$

Here, C[(Q(i,j),j] denotes the correlated squared distances between points Q(i,j) in the j-th set of nearest neighbor points. Accordingly, the correlated weight w(P) according to the embodiments is updated in consideration of the correlated squared distances between the neighbor points. The update operator updates the attribute value based on the correlated weight and prediction residuals.

According to embodiments, the update process may be performed by a program instruction stored in one or more memories included in the point cloud transmission device and the reception device. According to embodiments, the program instruction may be executed by the point cloud encoder and/or decoder (or processor), and cause the point cloud encoder and/or decoder to update attribute values.

According to embodiments, the point cloud encoder performs quantization (15400). Since the quantization is the same as that described with reference to FIGS. 1 to 14, a detailed description thereof is skipped. The weight according to the correlation between the points as described above may also be applied to the quantization.

According to embodiments, the point cloud encoder performs arithmetic encoding (15500). Since the arithmetic encoding is the same as that described with reference to FIGS. 1 to 14, a detailed description thereof will be skipped. The weight according to the correlation between the points described above may also be applied to the arithmetic encoding.

Figure 16:
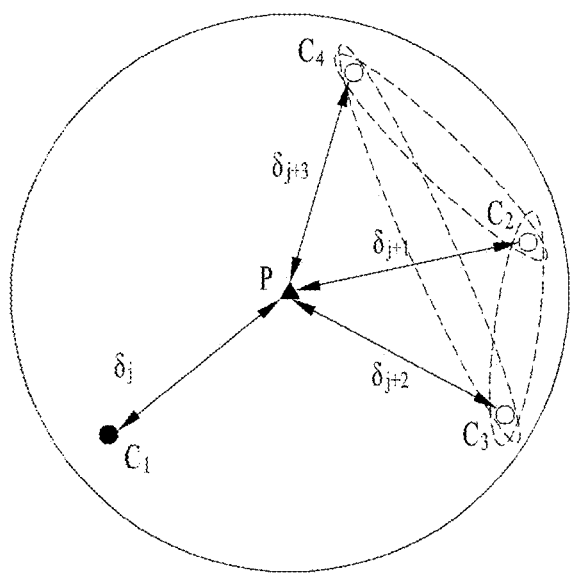
FIG. 16 illustrates an example of a point and neighbor points thereof.

FIG. 16 illustrates an example of a point and neighbor points thereof.

FIG. 16 shows a point P, which is a target of predicting transform coding described with reference to FIG. 15, and four neighbor points C1, C2, C3, and C4. As described with reference to FIG. 15, the point cloud encoder performs predicting transform coding (e.g., interpolation based prediction). The attribute (or attribute value) of point p may be a weighted average of the attributes of C1, C2, C3, and C4, which are nearest neighbor points of the point p. In the figure, $\delta_j$ denotes the distance between the point p and the neighbor point C1, and $\delta_{j+1}$ denotes the distance between the point p and the neighbor point C2. $\delta_{j+2}$ denotes the distance between the point p and the neighbor point C3, and $\delta_{j+3}$ denotes the distance between the point p and the neighbor point C4. As indicated by dotted lines in FIG. 16, the neighbor points C2, C3, and C4 are relatively densely positioned compared to the neighbor point C1.

Accordingly, predicting transform coding according to the embodiments multiplies the distances between the point p and the neighbor points illustrated in FIG. 16 by the circular correlated shift matrix as shown in Equation 2 to calculate correlated distances (e.g., $(\mu_j)_{j \in N_1}$) reflecting the correlation between the neighbor points. Accordingly, the predicting transform coding calculates a weighted average attribute in consideration of the correlation according to the density of the neighbor points (Equation 3).

Figure 17:
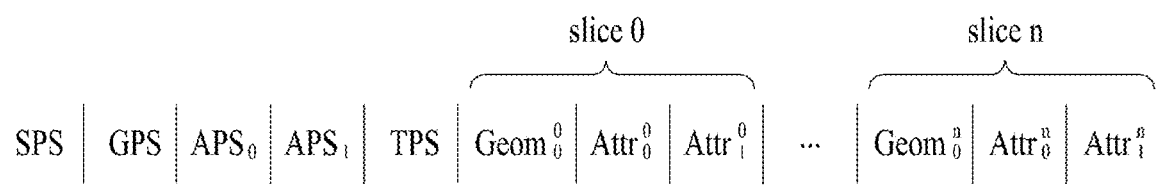
FIG. 17 shows an exemplary bitstream structure diagram.

FIG. 17 shows an exemplary bitstream structure diagram.

The point cloud processing device (e.g., the transmission device described with reference to FIGS. 1, 12, and 14) may transmit encoded point cloud data in the form of a bitstream. The bitstream is a sequence of bits that form a representation of point cloud data (or a point cloud frame).

The point cloud data (or point cloud frame) may be partitioned into tiles and slices.

The point cloud data may be partitioned into multiple slices, and is encoded in the bitstream. A slice is a set of points and is expressed as a series of syntax elements representing all or part of the encoded point cloud data. A slice may or may not have dependencies on other slices. In addition, a slice may include one geometry data unit, and may or may one or more attribute data units or no attribute data unit. As described above, attribute encoding is performed based on geometry encoding. Accordingly, attribute data units are based on the geometry data unit in the same slice. That is, the point cloud data reception device (e.g., the reception device 10004 or the point cloud video decoder 10006) may process the attribute data based on the decoded geometry data. Accordingly, the geometry data unit necessarily precedes the associated attribute data units in the slice. The data units in the slice are necessarily contiguous, and the sequential order of the slices is not specified.

A tile is a (three-dimensional) rectangular parallelepiped in a bounding box (e.g., the bounding box described with reference to FIG. 5). The bounding box may contain one or more tiles. A tile may fully or partially overlap with another tile. The tile may include one or more slices.

Accordingly, the point cloud data transmission device may process data corresponding to a tile according to the importance and provide high-quality point cloud content. That is, the point cloud data transmission device according to the embodiments may perform point cloud compression coding having better compression efficiency and appropriate latency on data corresponding to a region that is important to a user.

According to embodiments, a bitstream contains signaling information and a plurality of slices (slice 0, . . . , slice n). As shown in the figure, the signaling information precedes the slices in the bitstream. Accordingly, the point cloud data reception device may first obtain the signaling information and sequentially or selectively process a plurality of slices based on the signaling information. As shown in the figure, slice 0 contains one geometry data unit (Geom00) and two attribute data units (Attr00 and Attr10). In addition, the geometry data unit precedes the attribute data units in the same slice. Accordingly, the point cloud data reception device processes (decodes) the geometry data unit (or geometry data), and then processes the attribute data units (or attribute data) based on the processed geometry data. According to embodiments, the signaling information may be referred to as signaling data, metadata, or the like, and is not limited to this example.

According to embodiments, the signaling information includes a sequence parameter set (SPS), a geometry parameter set (GPS), and one or more attribute parameter sets (APSs). The SPS is encoding information about the entire sequence, such as a profile and a level, and may include comprehensive information (sequence level) about the entire sequence, such as a picture resolution and a video format. The GPS is information about geometry encoding applied to geometry contained in a sequence (bitstream). The GPS may include information about an octree (e.g., the octree described with reference to FIG. 6) and information about an octree depth. The APS is information about attribute encoding to which an attribute contained in the sequence (bitstream) is applied. As shown in the figure, the bitstream contains one or more APSs (e.g., APS0, APS1, . . . shown in the figure) according to an identifier for identifying the attribute.

According to embodiments, the signaling information may further include a TPS. The TPS is information about a tile, and may include information about a tile identifier, a tile size, and the like. According to embodiments, the signaling information is information of a sequence level, that is, a bitstream level, and is applied to a corresponding bitstream. In addition, the signaling information has a syntax structure including a syntax element and a descriptor describing the same. A pseudo code for describing the syntax may be used. In addition, the point cloud reception device may sequentially parse and process the syntax elements in the syntax.

Although not shown in the figure, according to the embodiments, the geometry data unit and the attribute data unit include a geometry header and an attribute header, respectively. According to embodiments, the geometry header and the attribute header are signaling information applied at a corresponding slice level and have the above-described syntax structure.

According to embodiments, the geometry header contains information (or signaling information) for processing a corresponding geometry data unit. Accordingly, the geometry header appears first in the geometry data unit. The point cloud reception device may parse the geometry header first to process the geometry data unit. The geometry header is related to the GPS, which contains information about the entire geometry. Accordingly, the geometry header contains information specifying gps_geom_parameter_set_id included in the GPS. The geometry header also contains tile information (e.g., tile_id) and a slice identifier which are related to a slice to which the geometry data unit belongs.

According to embodiments, the attribute header contains information (or signaling information) for processing a corresponding attribute data unit. Accordingly, the attribute header appears first in the attribute data unit. The point cloud reception device may parse the attribute header first to process the attribute data unit. The attribute header has an association with the APS, which contains information about all attributes. Accordingly, the attribute header contains information specifying aps_attr_parameter_set_id included in the APS. As described above, attribute decoding is based on geometry decoding. Accordingly, in order to determine a geometry data unit associated with the attribute data unit, the attribute header contains information specifying a slice identifier included in the geometry header.

When the point cloud data processing device performs attribute encoding based on the correlated weight described with reference to FIGS. 15 to 16, signaling information in the bitstream may include information about the correlated weight. According to embodiments, the information about the correlated weight may be included in signaling information (e.g., SPS, APS, etc.) of the sequence level or included in the slice level (e.g., attribute header).

FIG. 18 shows an example of signaling information according to embodiments.

FIG. 18 shows a syntax structure of the SPS described with reference to FIG. 17, and illustrates an example in which information about the correlated weight described with reference to FIG. 17 is contained in the SPS of the sequence level.

The syntax of the SPS includes the following syntax elements.

profile_compatibility_flags indicates whether the bitstream conforms to a specific profile for decoding or another profile. A profile specifies constraints imposed on the bitstream to specify capabilities for decoding the bitstream. Each profile is a subset of algorithmic features and constraints, and is supported by all decoders following the profile. It is for decoding and may be defined according to standards.

level_idc indicates a level applied to the bitstream. The level is used in all profiles. In general, a level corresponds to a specific decoder processing load and memory capability.

sps_bounding_box_present_flag indicates whether information about the bounding box is present in the SPS. sps_bounding_box_present_flag equal to 1 indicates that information about the bounding box is present. sps_bounding_box_present_flag equal to 0 indicates that information about the bounding box is not defined.

The following is information about the bounding box contained in the SPS when sps_bounding_box_present_flag is equal to 1.

sps_bounding_box_offset_x indicates the quantized x-axis offset of the source bounding box in the Cartesian coordinate system including the x, y, and z axes.

sps_bounding_box_offset_y indicates the quantized y-axis offset of the source bounding box in the Cartesian coordinate system including the x, y, and z axes.

sps_bounding_box_offset_z indicates the quantized z-axis offset of the source bounding box in the Cartesian coordinate system including the x, y, and z axes.

sps_bounding_box_scale_factor specifies a scale factor used to indicate the size of the source bounding box.

sps_bounding_box_size_width indicates the width of the source bounding box in the Cartesian coordinate system including the x, y, and z axes.

sps_bounding_box_size_height indicates the height of the source bounding box in the Cartesian coordinate system including the x, y, and z axes.

sps_bounding_box_size_depth indicates the depth of the source bounding box in the Cartesian coordinate system including the x, y, and z axes.

The SPS syntax further includes the following elements.

sps_source_scale_factor indicates the scale factor of source point cloud data.

sps_seq_parameter_set_id is an identifier of the SPS for reference by other syntax elements (e.g., seq_parameter_set_id in the GPS).

sps_num_attribute_sets indicates the number of encoded attributes in the bitstream. The value of sps_num_attribute_sets is in the range of 0 to 64.

The following for statement includes elements indicating information about each of the attributes as many as the number indicated by sps_num_attribute_sets. In the figure, i represents each attribute (or attribute set), and the value of i is greater than or equal to 0 and less than the number indicated by sps_num_attribute_sets.

attribute_dimension_minus1[i] indicates a valueless than the number of components of the i-th attribute by 1. When the attribute is a color, the attribute corresponds to a three-dimensional signal representing characteristics of light of a target point. For example, the attribute may be signaled as three components of RGB (Red, Green, Blue). The attribute may be signaled as three components of YUV, which are luma (luminance) and two chromas (saturation). When the attribute is reflectance, the attribute corresponds to a one-dimensional signal representing the ratio of the intensity of light reflectance of the target point.

attribute_instance_id[i] indicates the instant id of the i-th attribute. attribute_instance_id is used to distinguish the same attribute labels and attributes.

attribute_bitdepth_minus1[i] indicates a value less than the bit depth of the first component of the i-th attribute signal by 1. The value plus 1 specifies the bit depth of the first component.

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1.

attribute_cicp_matrix_coeffs[i] indicates matrix coefficients used to derive luma and chroma signals from RBG or YXZ primaries.

attribute_cicp_video_full_range_flag[i] indicates the black level and range of the luma and chroma signals as derived from E'Y, E'PB, and E'PR or E'R, E'G, and E'B real-valued component signals.

As described above, the SPS syntax contains information about a correlated weight. The following elements indicate information about the correlated weight described with reference to FIGS. 15 and 16.

attribute_correlated_weight_flag indicates whether the calculated distances should be correlated. attribute_correlated_weight_flag equal to 1 indicates the calculated distances should be correlated (i.e., a correlated weight is used). attribute_correlated_weight_flag equal to 0 indicates that the calculated distances are not correlated. The default value is inferred to be 0.

attribute_correlated_weight_method indicates a method of calculating a correlated weight when attribute_correlated_weight_flag is equal to 1. For example, the method of calculating a correlated weight includes Equations 2 to 4 described with reference to FIG. 15. Accordingly, the point cloud reception device calculates a correlated weight according to the method indicated by attribute_correlated_weight_method, and performs interpolation based prediction and lifting transform coding.

The information about the correlated weight according to the embodiments is not limited to the example above. Thus, the information about the correlated weight may further include information about a correlated weight variable and information about the number of neighbor nodes in the correlated point set.

According to embodiments, the syntax of the SPS includes the following syntax elements.

known_attribute_label_flag[i], known_attribute_label[i], and attribute_label_fourbytes[i] are used together to identify the type of data carried in the i-th attribute. The known_attribute_label_flag[i] indicates whether the attribute is identified by the value of known_attribute_label[i] or another object identifier attribute_label_fourbytes[i].

sps_extension_flag indicates whether sps_extension_data_flag is present in the SPS. sps_extension_flag equal to 0 indicates that the sps_extension_data_flag syntax element is not present in the SPS syntax structure. The value 1 of sps_extension_flag is reserved for future use. The decoder may ignore all sps_extension_data_flag syntax elements following sps_extension_flag equal to 1.

sps_extension_data_flag indicates whether data for future use is present and may have any value.

The SPS syntax is not limited to the example above. It may further include additional elements or may exclude some elements shown in the figure for efficiency of signaling. Some elements may be signaled through signaling information (e.g., APS, attribute header, etc.) other than the SPS or through an attribute data unit.

FIG. 19 illustrates an example of signaling information according to embodiments.

FIG. 19 is a syntax structure of the APS described with reference to FIG. 17, and illustrates an example in which information about the correlated weight described with reference to FIG. 17 is contained in an APS of the sequence level.

The syntax of the APS includes the following syntax elements.

aps_attr_parameter_set_id indicates an identifier of the APS for reference by other syntax elements. aps_attr_parameter_set_id has a value in the range of 0 to 15. One or more attribute data units are contained in the bitstream (e.g., the bitstream described with reference to FIG. 17), and each of the attribute data units includes an attribute header. The attribute header includes a field (e.g., ash_attr_parameter_set_id) having the same value as aps_attr_parameter_set_id. The point cloud reception device according to the embodiments parses the APS and processes the attribute data units referring to the same aps_attr_parameter_set_id, based on the parsed APS and the attribute header.

aps_seq_parameter_set_id specifies the value of sps_seq_parameter_set_id for the active SPS. aps_seq_parameter_set_id has a value in the range of 0 to 15.

attr_coding_type indicates the attribute coding type for a given value of attr_coding_type. Attribute coding means attribute encoding. As described above, attribute coding uses at least one of RAHT coding, predicting transform coding, and lifting transform coding, and attr_coding_type indicates any one of the aforementioned three coding types. Accordingly, the value of attr_coding_type is equal to any one of 0, 1, or 2 in the bitstream. Other values of attr_coding_type may be used later by ISO/IEC. Accordingly, the point cloud reception device according to the embodiments ignores attr_coding_type having values other than 0, 1, and 2. When attr_coding_type is equal to 0, the attribute coding type is predicting transform coding. When attr_coding_type is equal to 1, the attribute coding type is RAHT coding. When attr_coding_type is equal to 2, the attribute coding type is lifting transform coding. The values of attr_coding_type may be changed and are not limited to this example. For example, attr_coding_type equal to 0 indicates that the attribute coding type is RAHT coding, attr_coding_type equal to 1 indicates that the attribute coding type is LOD with predicting transform coding, and_coding_type equal to 2 indicates that the attribute coding type is LOD with lifting transform coding.

aps_attr_initial_qp indicates the initial value of the variable SliceQP for each slice referring to the current APS.

aps_attr_chroma_qp_offset specifies an offset applied to the initial quantization parameter signaled by aps_attr_initial_qp.

aps_slice_qp_delta_present_flag indicates whether component QP offsets indicated by ash_attr_qp_offset are present in the header of the attribute data unit.

As described above, the APS syntax contains information about the correlated weight described with reference to FIGS. 15 and 16. As shown in the figure, the APS syntax includes attribute_correlated_weight_flag and attribute_correlated_weight method. Each element is the same as that described with reference to FIG. 18, and thus description thereof is skipped.

The information about the correlated weight according to the embodiments is not limited to the example above. Thus, the information about the correlated weight may further include information about a correlated weight variable and information about the number of neighbor nodes in the correlated point set.

When the value of attr_coding_type indicates lifting transform coding, the following syntax elements are present in the APS.

lifting_num_pred_nearest_neighbours specifies the maximum number of nearest neighbors to be used for prediction.

lifting_max_num_direct_predictors indicates the maximum number of predictors to be used for direct prediction.

lifting_search_range specifies the search range used to determine nearest neighbors to be used for prediction and to build distance-based LODs.

lifting_lod_regular_sampling_enabled_flag indicates a sampling strategy used to build LODs. lifting_lod_regular_sampling_enabled_flag equal to 1 indicates that LODs are built using a regular sampling strategy. lifting_lod_regular_sampling_enabled_flag equal to 0 indicates that LODs are built using a distance-based sampling strategy.

lifting_num_detail_levels_minus1 indicates the number of LODs for the attribute coding. The value of lifting_num_detail_levels_minus1 is greater than or equal to 0.

The following for statement includes elements indicating information about each of LODs as many as the number indicated by lifting_num_detail_levels_minus1. In the figure, idx indicates each LOD. The value of idx is greater than or equal to 0 and less than the number indicated by lifting_num_detail_levels_minus1.

When the value of lifting_lod_regular_sampling_enabled_flag is 1, lifting_sampling_period[idx] is included. When the value of lifting_lod_regular_sampling_enabled_flag is 0, lifting_sampling_distance_squared[idx] is included.

lifting_sampling_period[idx] specifies the sampling period for the LOD idx.

lifting_sampling_distance_squared[idx] specifies a scaling factor for deriving the square of the sampling distance for the LOD idx.

When attr_coding_type indicates that attribute coding is predicting transform coding, the APS includes the following syntax elements.

lifting_adaptive_prediction_threshold indicates a threshold to enable adaptive prediction.

lifting_intra_lod_prediction_num_layers specifies the number of LoD layers where decoded points in the same LoD layer can be referenced to generate a prediction value of a target point.

According to embodiments, the syntax of the APS includes the following syntax elements.

aps_extension_flag indicates whether aps_extension_data_flag is present in the APS. aps_extension_flag equal to 0 indicates that the aps_extension_data_flag syntax element is not present in the APS syntax structure. The value 1 of aps_extension_flag is reserved for future use. The decoder may ignore all aps_extension_data_flag syntax elements following aps_extension_flag equal to 1.

aps_extension_data_flag indicates whether there is data for future use, and may have any value.

The APS syntax is not limited to the example above. It may further include additional elements or may exclude some elements shown in the figure for efficiency of signaling. Some elements may be signaled through signaling information (e.g., attribute header, etc.) other than the APS or through an attribute data unit.

As described with reference to FIGS. 15 to 19, when there are two or more neighbor points, the correlated weight may be calculated based on a correlation between the points. As a method of calculating the correlated weight, the correlated weight may be calculated without changing the existing attribute encoding algorithm, and thus flexibility in system design may be secured. In addition, performance of encoding and decoding is improved by using the correlated weight in place of a weighting constant used in the prediction/lifting transform. The method of calculating a correlated weight and the correlated weight according to embodiments may be applied to all functions requiring a prediction algorithm, such as quantization.

The method of calculating a correlation degree (e.g., Equation 2) may or may not include the distance of a corresponding point. In addition, the method of calculating a correlation degree may include operations of addition, multiplication, and division using the matrix described with reference to FIG. 2. The method of calculating a correlation degree may also include an operation of removing a correlated value or assigning and multiplying each constant using the correlated value. Each constant may include not only an integer but also a complex number, and may have a fixed value or a variable value.

The correlated weight is a sum of weights based on the correlation degree and corresponds to an average or variance (e.g., Equation 3). A weight not combined with correlations may be used as an average or variance.

FIG. 20 illustrates a method of encoding correlated weights according to embodiments.

FIG. 20 shows instructions representing the method of calculating correlated weights (e.g., Equation 2 and Equation 3) in various ways when there are three points.

In the figure, weighted_sum denotes the sum of each point and a correlation degree, and the method of calculating the correlation degree may be changed according to embodiments. w0, w1, and w2 denote correlated weights reflecting the correlation degrees calculated for respective points.

The first block shows the process of calculating a correlation degree by multiplying correlated values by any constants alpha, beta, and gamma. The second block shows the process of calculating a correlation degree simply based on the distances of the points. The third block shows the process of calculating a correlation degree based on the squares of the point distances. The fourth block shows the process of calculating a correlation degree based on the sum of point distances. Each block shows correlated weights w0, w1, and w2 for the respective points, which reflect the correlation degree calculated according to the process of calculating the correlation degree. The correlated weights may be changed according to the calculation method and type of the correlation. In addition, the method of calculating a correlation degree is not limited to the above-described example.

The point cloud processing device described with reference to FIGS. 1 to 20 supports spatial scalability decoding. The spatial scalability decoding is decoding performed on all or part of the geometry and/or attributes to provide point cloud content at various resolutions according to decoding performance of a point cloud reception device (e.g., the reception device 10004 of FIG. 1, the point cloud decoder of FIGS. 10 and 11, and the reception device of FIG. 13). According to embodiments, the part of the geometry and attributes is referred to as partial geometry and a partial attribute. The scalable decoding applied to the geometry according to the embodiments is referred to as scalable geometry decoding or geometry scalable decoding. The scalable decoding applied to the attribute according to the embodiments is referred to as scalable attribute decoding or attribute scalable decoding. As described with reference to FIGS. 1 to 17, points of the point cloud content are distributed in a 3D space, and the distributed points are expressed in an octree structure (e.g., the octree described with reference to FIG. 6). The octree structure is an octal tree structure, in which the depth increases from an upper node toward a lower node. According to embodiments, the depth is referred to as a level and/or a layer.

The point cloud processing device (or geometry encoder) performs geometry encoding based on the octree structure. In addition, the point cloud processing device (or attribute encoder) generates an LOD and performs attribute encoding (e.g., RAHT transformation, predicting transform, lifting transform, etc.) based on the octree structure. Since the LOD is generated based on the octree structure, the octree structure is considered to divide the grouping of points, and organize the number of points for geometry and attributes. The level of the LOD may correspond to a depth of the octree. Since the LOD (or octree depth) must be large enough to exhibit the original quality, spatial scalability is very useful when the source point cloud is densely arranged even in a local region. Through spatial scalability, the point cloud reception device (or decoder) may provide low-resolution point cloud content such as a thumbnail having a low decoder complexity and/or a small bandwidth. When spatial scalability decoding is supported, the point cloud processing device transmits information for spatial scalability decoding through signaling information (e.g., SPS, APS, attribute header, etc.) contained in the bitstream that is described with reference to FIG. 17.

The point cloud reception device secures information for spatial scalability decoding through signaling information contained in the bitstream. The point cloud reception device performs geometry decoding on the entire geometry or partial geometry corresponding to a specific depth (or level) from an upper node of the octree structure toward a lower node. As described above, attribute decoding is based on geometry decoding. Thus, the point cloud reception device may generate an LOD based on the decoded geometry (or decoded octree structure) and perform attribute decoding (e.g., RAHT transform, predicting transform, lifting transform, etc.) on the entire attribute and/or the partial attribute.

Figure 21:
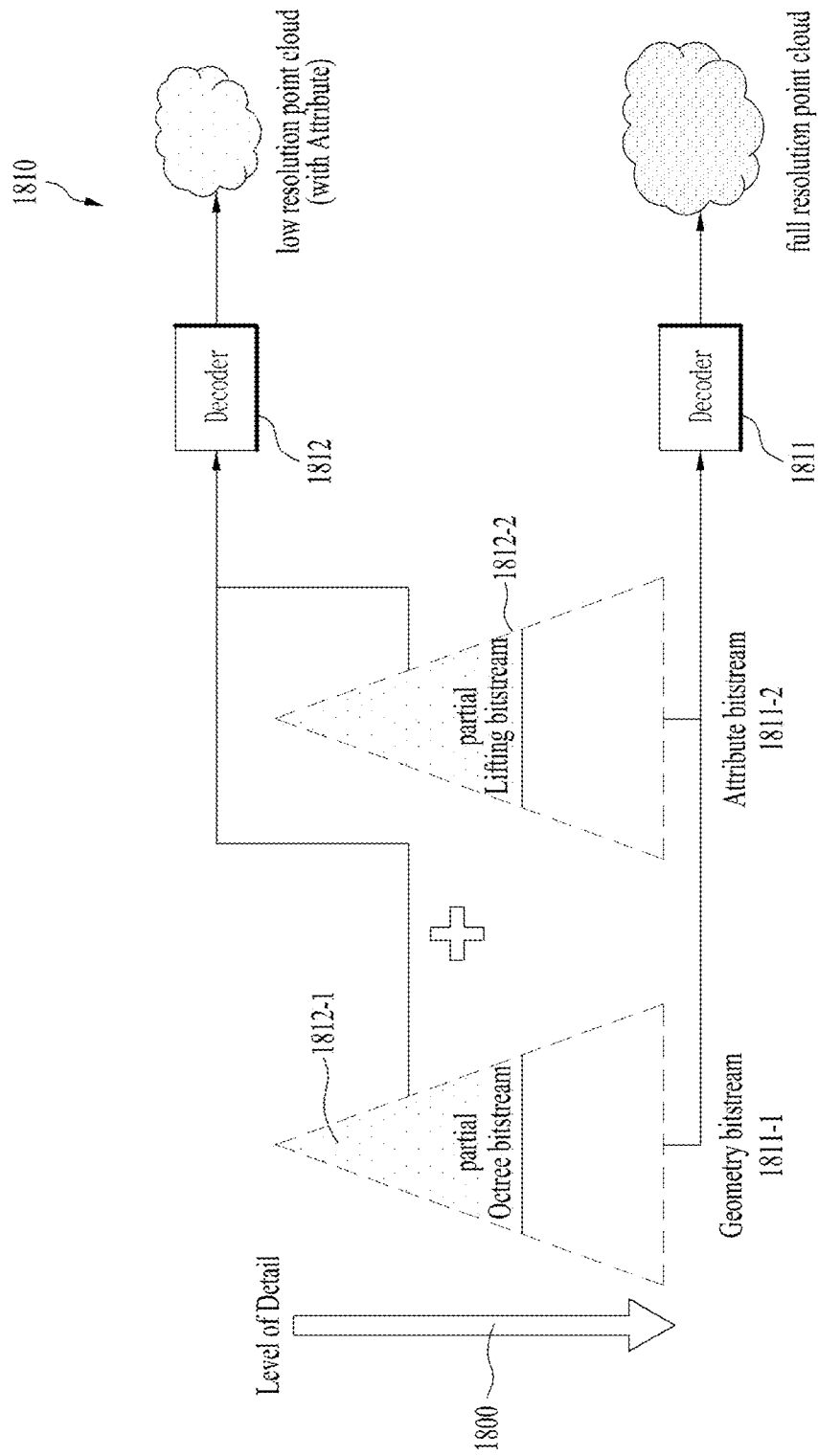
FIG. 21 illustrates an example of spatial scalability decoding.

FIG. 21 illustrates an example of spatial scalability decoding.

An arrow 1800 shown in the figure indicates a direction in which the level of the LOD increases.

As described with reference to FIGS. 1 to 14, the point cloud processing device generates an LOD based on an octree structure. The LOD is intended to manage the attributes of points having an octree structure, and increase in the LOD value indicates that the details of the point content increase. An LOD may correspond to one or more depths of the octree structure. The highest node of the octree structure corresponds to the lowest depth or the first depth, and is called a root. The lowest node of the octree structure corresponds to the highest depth or the last depth, and is called a leaf. The depth of the octree structure increases in a direction from the root to the leaf, which is identical to the direction in which the arrow points.

According to embodiments, the point cloud decoder performs decoding 1811 for providing full-resolution point cloud content or decoding 1812 for providing low-resolution point cloud content according to performance thereof. The point cloud decoder provides full-resolution point cloud content through decoding 1811 of a geometry bitstream 1811-1 and an attribute bitstream 1812-1, which correspond to the entire octree structure. The point cloud decoder provides low-resolution point cloud content through decoding 1812 of a partial geometry bitstream 1812-1 and a partial attribute bitstream 1812-2, which correspond to a specific depth of the octree structure. FIG. 21 illustrates lifting transform as attribute decoding, but embodiments are not limited to this example.

As described above, the signaling information (e.g., SPS, APS, attribute header, etc.) in the bitstream (e.g., the bitstream of FIG. 17) may include scalability information (e.g., scalable_lifting_enabled_flag or lifting_scalability_enabled_ flag) related to spatial scalability decoding (or lifting transform) at the sequence level or the slice level. As described above, attribute decoding is performed based on the decoded geometry octree structure. The information related to spatial scalability decoding (or lifting transform) indicates whether the entire octree structure is required or a partial octree structure is required to decode a partial attribute.

The point cloud reception device secures the signaling information of the bitstream, and performs scalable attribute decoding based on the entire octree structure or a partial octree structure, which is a result of decoding of the geometry, according to the information related to spatial scalability decoding.

As described above, the LOD is generated based on the octree structure (e.g., operation 1520 in FIG. 15). Accordingly, the level of the LOD is generated based on the depth of the octree. When the octree structure is changed, the LOD structure is also changed. The point cloud encoder (e.g., the point cloud encoder described with reference to FIG. 15) performs LOD-based lifting transform (e.g., operation 1530 in FIG. 15). As described above, the point cloud processing device performs lifting transform coding from the LOD at the highest level to the LOD at the lowest level. According to embodiments, the lifting transform coding uses an update operator to calculate a predicted attribute of each point. The update operator of the corresponding point may calculate an updated attribute value based on the calculated weight and the residual value. According to embodiments, the point cloud processing device determines (or calculates or derives) a quantization weight according to a quantization weight derivation process, and performs quantization based on the determined quantization weight.

The point cloud reception device (or point cloud decoder) according to the embodiments may perform inverse quantization by restoring an attribute value using an update operator and calculating a quantization weight in the same manner as the point cloud processing device.

The density of points belonging to an LOD at a level is different that of points belonging to an LOD at another level. For example, the density of points belonging to an LOD of a level is lower than that of points belonging to an LOD of a lower level. Thus, according to the embodiments, the quantization weight is derived from the sum of the distances in the LOD of the higher level. However, when spatial scalability decoding is performed, the point cloud reception device cannot accurately calculate the quantization weight because it is unaware of low LOD information. Accordingly, the quantization weight is fixed by the number of points of the LOD. The following shows a process of calculating a quantization weight for each LOD to support attribute decoding (e.g., lifting transform coding) performed based on a partial octree structure.

for $i = 0$ to $LODCount$ $$\left\{ QuantizationWeight[i] = \frac{pointCount - \sum_{k=0}^{i-1} predictorCount[k]}{predictorCount[i]} = \right.$$

$$\left( \frac{\sum_{k=1}^{LODCount} predictorCount[k]}{predictorCount[i]} \right) QuantizationWeight[i] =$$

$$\left. (int)(QuantizationWeight[i] \ll kFixedPointWeightShift) \right\}$$

Here, i is a parameter indicating the level of each LOD, and the value of i is greater than or equal to 0 and less than the number of LODs (LODcount). pointCount is the number of points belonging to the corresponding LOD, and predictorCount denotes the number of predictors of points belonging to an LOD lower than the corresponding LOD. predictorCount[i] denotes the number of predictors of points belonging to the corresponding LOD. As shown in the equation, the weight is calculated based on the number of attributes and a fixed constant (e.g., kFixedPointweightShift).

The above-described equation is used to calculate a quantization weight based on information about an LOD in which points are densely arranged, not a point having a predicted value for each LOD. Accordingly, when points are evenly distributed in one or more LODs, or when the gap of the LOD index is large and the distribution of the points is irregular, performance of the decoder may be deteriorated depending on the quantization weight.

Accordingly, the point cloud transmission device and the point cloud reception device according to the embodiments performs an improved quantization weight derivation process to obtain mathematical optimization in performing lifting transform coding (e.g., lifting transform coding performed based on a partial octree structure). The improved quantization weight derivation process may calculate an improved quantization weight that may be changed without applying a fixed constant. Accordingly, the improved quantization value derivation process minimizes the change of the quantization weight according to the point cloud system, and does not change the fixed constant among systems. In addition, the quantization weight corresponds to a mathematically optimal value, and thus secures a higher performance gain compared to the existing quantization weight. Further, since the improved quantization weight derivation process does not require an operation for every point, the complexity of the point cloud receiver may be lowered.

According to embodiments, the quantization weight derivation process may be performed by program instructions stored in one or more memories included in the point cloud transmission device and reception device. The program instructions are executed by a point cloud encoder and/or decoder (or processor), and cause the point cloud encoder and/or decoder to calculate/derive a quantization weight.

According to embodiments, the lifting transform is expressed as a linear function representing the sum of the quantization weight and the attribute value. The equation given below is a linear function representing the lifting transform, and is determined to satisfy the maximum benefit with the allocated value of a total resource. The resource according to the embodiments refers to the sum of products of a weight and an attribute value (a voltage representing the attribute value) of each point.

$$SumAttribute = \sum_{j=0}^{N} w_j a_j \quad \text{[Equation 4]}$$

Parameter j is the index of each point, greater than or equal to 0 and less than or equal to N. Parameter N denotes the total number of points in the expected point cloud. That is, N corresponds to the total number of points to be transmitted by the point cloud transmission device. Parameter $w_j$ is a quantization weight (or an improved quantization weight) and is determined (or calculated or derived) by the improved quantization weight derivation process. Parameter $a_j$ denotes the attribute value of each point. SumAttribute denotes the sum of the quantization weights and the attribute values, and is in the form of multiplication and addition of N linear functions.

The point cloud reception device may secure the brightness and color values of the corresponding point through the value of SumAttribute. The condition for optimizing the function representing the above-described lifting transform is expressed by the following equation.

$$\underset{w_1, w_2, \ldots, w_N}{\text{MAX}} \sum_{j=0}^{N} w_j a_j \quad \text{[Equation 5]}$$

-continued $$\text{Subject to } \sum_{j=0}^{N} w_j \leq TotalPredictedCount$$

$$w_j \geq 1, \text{ for } j = 1, \ldots, N$$

As shown in the equation above, a function representing the lifting transform may be optimized by a constraint applied to the parameter $w_j$. According to embodiments, $w_j$ is greater than or equal to 1. Also, the sum (or the total weight) of the N values of $w_j$ (where j is greater than or equal to 0 and less than or equal to N) is less than or equal to the total number of predicted points (TotalPredictedCount). This is intended to prevent the quantization weight from increasing infinitely, and to prevent the overflow issue from occurring in a memory required for calculation. In addition, the equation used to drive lifting transform is composed of a linear form and integer spaces, the convexity of the function is maintained.

An arbitrarily defined function fj constituting the equation above consists of multiplication and addition of integers and decimals. Accordingly, the function fj is expressed as a convex function, and the function -fj is a concave function according to a necessary and sufficient condition. When the values of $w_1$, $w_2$, . . . , and $w_N$ are greater than or equal to 1, the functions f1 of $w_1$, f2 of $w_1$, . . . , and fN are also convex functions, and therefore a combination of two or more of the convex functions takes the form of a convex function. According to embodiments, the weight (or weight constant) $w_j$ may be modified or changed, and have an optimized value. Also, when the function fj is a combination or cluster of convex functions, g, which is a cluster function in fi, that is, a cluster function, is also configured as a convex function. Accordingly, an optimized value of a cluster of weights grouped by LOD may be obtained. According to the embodiments, the function g has a maximum value and a minimum value.

As described above, the quantization weight is determined (calculated or derived) by TotalPredictedCount. When the point cloud transmission device and the point cloud reception device according to the embodiments transmit/receive information about the total number of points (e.g., Total Count), the quantization weight has a global optimized value determined based on the total number of points. When the point cloud reception device predicts TotalPredictedCount, the quantization weight has a local optimized value determined based on TotalPredictedCount. The above-described equations use various methods such as the Karush-Kuhn-Tucker (KKT) condition, geometry/non-geometry technique, and group-based power constraints. Since it is defined that a Lagrange multiplier in a real space (λ∈R), an inequality constraint, and w*≥0 representing an optimal value are present, the point cloud transmission device and the reception device according to the embodiments may perform an improved quantization weight derivation process by generating a condition for calculating a quantization weight (e.g., a change in a constraint).

Figure 22:
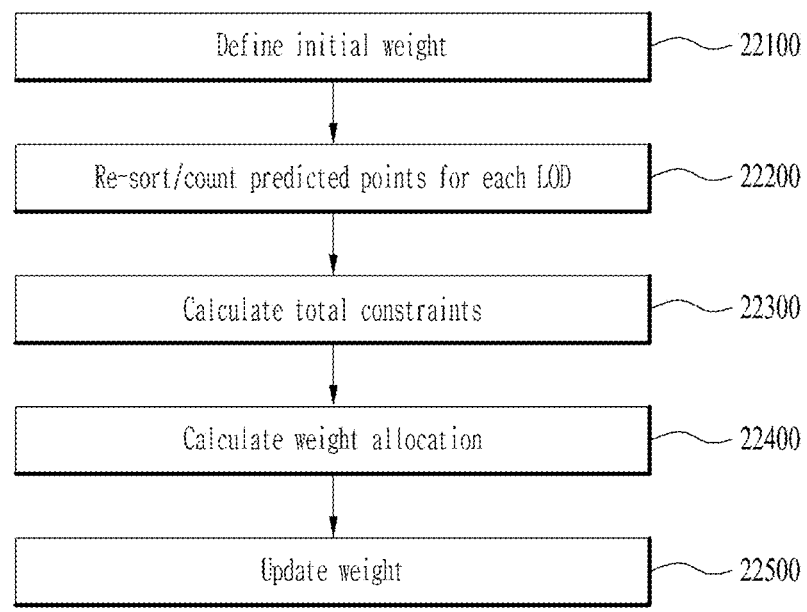
FIG. 22 shows an exemplary improved quantization weight derivation process.

FIG. 22 shows an exemplary improved quantization weight derivation process.

FIG. 22 is a flow diagram illustrating an improved quantization weight derivation process. The flow diagram includes one or more operations. The operations may be performed simultaneously or sequentially.

The improved quantization weight derivation process defines an initial weight (or initial quantization weight) (22100). According to the embodiments, the initial weight is determined based on an average transceiver power. That is, the initial weight may be determined based on an average energy value or a total energy value at the 32-bit and 64-bit level in consideration of the data memory size, computational complexity, and the like. In addition, when all point cloud data are normalized, the initial weight is determined as 1.

The improved quantization weight derivation process re-sorts/counts the number of predicted points for each LOD (e.g., TotalPredictedCount described above) (22200). The point represents a geometry point or an attribute point. The number of predicted points for each LOD may be secured from the decoded geometry. The number of predicted points for each LOD is stored as a parameter. The improved quantization weight derivation process may store the number of actual points (e.g., TotalCount described above) as a parameter without counting the number of predicted points.

The improved quantization weight derivation process calculates total constraints (22300). The constraints are applied to a weight or a sum of weights (e.g., the sum of $w_j$ in Equation 8). According to embodiments, the constraints may include, but are not limited to, the number of points of total accumulated LODs for each LOD, the number of points of some LODs, the number of points belonging to a subset, and the number of points according to grouping of LODs.

The improved quantization weight derivation process calculates a weight allocation that is determined based on the calculated constraints (22400). That is, the improved quantization weight derivation process allocates resources according to each LoD level and points in the LoD based on the constraints. As described above, a resource is a sum of attributes multiplied by a weight for each point. Thus, the resource is proportionally distributed according to the LoD level and the points in the LoD.

That is, the total number of points is allocated to each LOD level according to a weight based on constraints.

The improved quantization weight derivation process updates the weight (22500). The updated weight (or updated quantization weight) may be defined as an allocated weight, or may be generated by accumulating the allocated weight to the initial weight, or by modifying and combining some of the existing updated weights. The final updated weight has an optimized value.

Hereinafter, a process of calculating a weight allocation determined based on the calculated constraints described with reference to FIG. 22 will be described.

As described above, the improved quantization weight derivation process is based on the total number of predicted points (e.g., TotalPredictedCount described above). Since the total number of predicted points is limited, the improved quantization weight derivation process may derive the same optimal value or a similar optimal value. According to embodiments, the optimal value is calculated based on the ratio of a resource (the number of accumulated points of an LOD) to the total resource (the total number of points).

The process of calculating the number of accumulated points for each LOD is performed by program instructions stored in one or more memories included in the point cloud transmission device and the reception device. According to embodiments, the program instructions are executed by a point cloud encoder and/or decoder (or processor), and cause the point cloud encoder and/or decoder to calculate the number of accumulated points for each LOD. A process of calculating the i-th optimized value (improved quantization weight) is expressed as follows.

for i=0<LoDCount{
OptimalWeight[i]=numberOfPointsPerLOD[LodCount−1]/numberOfPointsPerLOD[i];
}

OptimalWeight[i] denotes the optimized value of the i-th LOD. numberOfPointsPerLOD[LodCount−1] is the number of all points up to an LOD level corresponding to a value less than the value of LoDCount by 1. That is, numberOfPointsPerLOD[LodCount−1] denotes the total sum of the number of points belonging to each LOD, from the LOD of the level with i equal to 0 to the LOD of the level with i equal to LodCount−1 (e.g., Total sum of the number of points of LOD 0 equal to 1, the number of points of LOD 1 equal to 7, . . . , and the number of points of LOD LodCount−1 equal to XX). According to embodiments, numberOfPointsPerLOD[LodCount−1] may be stored in the form of an index or the like, and may be secured from the stored maximum index.

As above, the i-th optimized value is generated based on the constraint and Ratio[i]. According to embodiments, Ratio[i] may be changed according to irregularities in total energy occurring in an actual environment such as a point cloud noise error. For example, numberOfpointsperLOD[i−1] may be used instead of numberOfpointsperLOD[i], or a part of numberOfpointsperLOD[i] may be grouped and treated as a variable. According to embodiments, the grouped variables may include sequential variables, such as i+1 and i+2, or non-sequential variables, such as i, i+4, and i+6. The constraint numberOfPointsPerLOD[LodCount−1] may be expressed as numberOfPointsPerLOD [k], where k is i−1, i−2, . . . , 0, or i+1, i+2. Also, part of numberOfPointsPerLOD[k] may be grouped and treated as a variable. For example, according to embodiments, the grouped variables include sequential variables, such as k+1 and k+2, or non-sequential variables, such as k, k+4, and k+6. A specific constant may be subtracted from, added to, or combined with NumberOfPointsPerLOD[i] and numberOfPointsPerLOD[k] expressed by variables i and k. For example, when two constants alpha and beta are given for i and k, numberOfPointsPerLOD[i](+ or −)alpha or numberOfPointsPerLOD[i](* or /)alpha may be yielded and numberOfPointsPerLOD[k](+ or may be −)beta or numberOfPointsPerLOD [k](* or /)beta may be yielded.

Different improved quantization weight derivation processes may be applied to points of the respective LOD levels of the same attribute. For example, when i=1, the optimized value may be inferred through numberOfPointPerLOD [LoDCount−1]/numberOfPointsPerLoD[i]. When i is greater than 1, the optimized value may be inferred through (numberOfPointPerLOD[LoDCount−1]−numberOfPointsPerLoD[i])/numberOfPointsPerLoD[i].

Different improved quantization weight derivation processes may be applied to points according to an LoD level of different attributes. Accordingly, the quantization weight according to the LOD level given when the attribute is reflectance and the quantization weight according to the LOD level given when the attribute is color have different optimized values.

Different improved quantization weight derivation processes may be applied to points according to LoD levels of respective sub-components (e.g., luma, chroma, etc.) in the same attribute. Thus, when the attribute is color (YCbCr), the quantization weight of the sub-component Y (luma) and the quantization weight of the sub-components Cb and Cr (chroma) have different optimized values.

Figure 23:
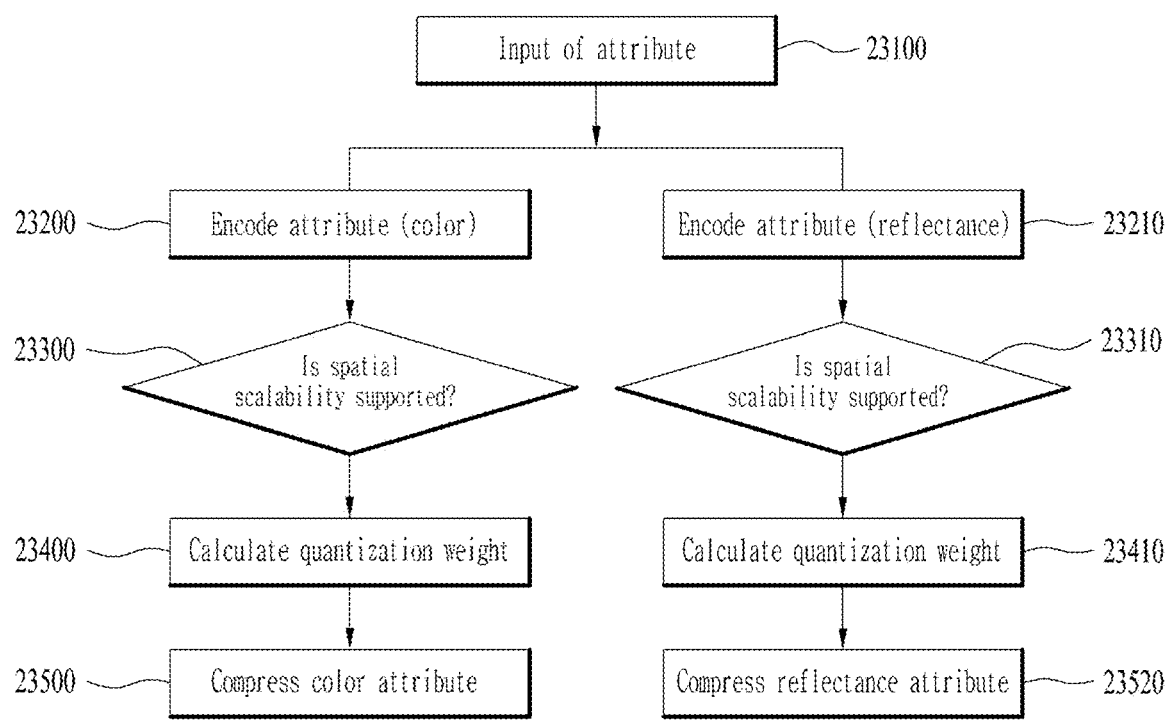
FIG. 23 is a flow diagram illustrating point cloud encoding according to embodiments.

FIG. 23 is a flow diagram illustrating point cloud encoding according to embodiments.

The point cloud transmission device or point cloud encoder described with reference to FIGS. 1 to 22 may perform attribute encoding to support spatial scalability decoding described with reference to FIG. 21. According to the embodiments, the attribute encoding includes at least one of RAHT coding, predicting transform coding, or lifting transform coding. The lifting transform coding, which is performed to support spatial scalability decoding, performs the improved quantization weight calculation process described with reference to FIGS. 21 to 22.

As shown in FIG. 23, the point cloud encoder receives an input of an attribute (23100). According to embodiments, the attribute includes color and reflectance.

The point cloud encoder according to the embodiments performs attribute encoding according to the attribute type (23200, 23210). As shown in the figure, the point cloud encoder independently performs encoding in the case where the attribute is color and the case where the attribute is reflectance. The two attribute encoding operations may be performed simultaneously or sequentially. The attribute encoding performs an LOD-based lifting transform (e.g., the operation 1530 of FIG. 15). As described above, the point cloud processing device performs lifting transform coding from the LOD at the highest level to the LOD at the lowest level.

As described above, the point cloud encoding may support spatial scalability decoding (23300, 23310). According to embodiments, the spatial scalability decoding may be performed on some or all of the geometry and/or attributes to provide point cloud content at various resolutions according to decoding performance of the point cloud reception device (e.g., the reception device 10004 of FIG. 1, the point cloud decoder of FIGS. 10 and 11, and the reception device of FIG. 13). Through spatial scalability, the point cloud reception device (or decoder) may provide low-resolution point cloud content such as a thumbnail having a low decoder complexity and/or a small bandwidth. When spatial scalability decoding is supported, the point cloud processing device transmits information for spatial scalability decoding through signaling information (e.g., SPS, APS, attribute header, etc.) contained in the bitstream that is described with reference to FIG. 17. As described above, the signaling information (e.g., SPS, APS, attribute header, etc.) in the bitstream (e.g., the bitstream of FIG. 17) may include scalability information (scalability information indicating whether decoding of the attribute can be performed based on the partial octree structure) (e.g., scalable_lifting_enabled_flag or lifting_scalability_enabled_flag) related to spatial scalability decoding (or lifting transform) at the sequence level or the slice level. As described above, attribute decoding is performed based on the decoded geometry octree structure. The information related to spatial scalability decoding (or lifting transform) indicates whether the entire octree structure is required or a partial octree structure is required to decode a partial attribute. Accordingly, the point cloud reception device secures the signaling information of the bitstream, and performs scalable attribute decoding based on the entire octree structure or a partial octree structure, which is a result of decoding of the geometry, according to the information related to spatial scalability decoding.

When spatial scalability decoding (e.g., lifting transform coding) performed based on the partial octree structure is supported, the point cloud encoder according to the embodiments calculates a quantization weight using the improved quantization weight derivation process described with reference to FIGS. 21 to 23 (23400, 23410). The improved quantization weight derivation process is the same as that of FIGS. 21 to 22, and thus a detailed description will be skipped. The point cloud reception device (or point cloud decoder) according to the embodiments may perform inverse quantization by calculating a quantization weight in the same manner as the point cloud processing device.

The point cloud encoder compresses the color attribute and the reflectance attribute (23500, 23510).

The point cloud encoding shown in FIG. 23 may be performed by program instructions stored in one or more memories included in the point cloud transmission device and the reception device. According to embodiments, the program instructions are executed by a point cloud encoder and/or decoder (or processor), and cause the point cloud encoder and/or decoder to perform point cloud encoding and/or decoding.

Figure 24:
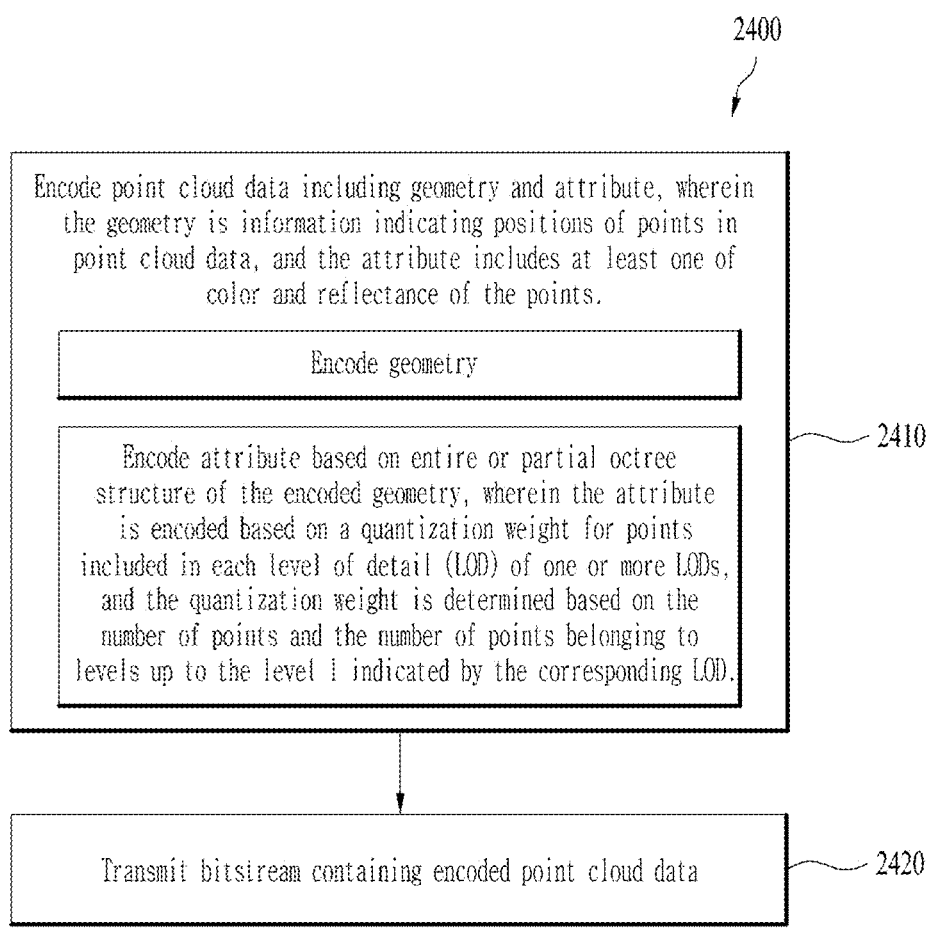
FIG. 24 is a flow diagram illustrating a method of transmitting point cloud data according to embodiments.

FIG. 24 is a flow diagram illustrating a method of transmitting point cloud data according to embodiments.

The flow diagram 2400 of FIG. 24 illustrate a method of transmitting point cloud data by the point cloud data transmission device described with reference to FIGS. 1 to 23 (e.g., the transmission device or point cloud encoder described with reference to FIGS. 1, 12, and 14). The point cloud data transmission device encodes point cloud data containing geometry and an attribute (2410). The geometry is information indicating positions of points in the point cloud data, and the attribute includes at least one of color and reflectance of the points. The point cloud data transmission device encodes the geometry. As described above with reference to FIGS. 1 to 23, attribute encoding is dependent on geometry encoding. Accordingly, the point cloud data transmission device encodes the attribute based on the entire or partial octree structure of the encoded geometry as described with reference to FIG. 21. The attribute is encoded based on a quantization weight for points included in each level of detail (LOD) of one or more LODs. The quantization weight is determined based on the number of points and the number of points belonging to a level l represented by the LOD. Details are the same as those described with reference to FIGS. 20 to 23, and a description thereof will be skipped.

The quantization weight according to the embodiments is expressed as follows.

$$W_{extended\ LoD_l} = \frac{\text{Total point number}}{\text{point number in } LoD_l} = \frac{\text{Total point number}}{\sum_{i=0}^{l} \text{point number in } R_i}$$

Here, $W_{extended\ LoD_l}$ denotes the quantization weight of the LOD with level l, "Total point number" denotes the number of points, "point number in LODi" denotes the number of accumulated points that belong to a level l represented by the LOD, and "point number in Ri" denotes the number of points belonging only to the LOD having level i. The value of point number in LODi is equal to the sum of the values of point number in Ri for i ranging from 0 to 1. The quantization weight according to the embodiments is the same as the process of calculating the i-th optimized value (improved quantization weight) or the calculated quantization weight described with reference to FIGS. 21 to 22, and thus a detailed description thereof will be skipped.

As described with reference to FIGS. 15 to 23, the point cloud data transmission device generates one or more LODs by re-sorting points, performs lifting transform coding on the attribute based on the one or more LODs, and quantizes the lifting transform coded attribute based on the quantization weight. The quantization weight according to the embodiments is used to decode the attribute encoded based on a partial octree structure of geometry. That is, as described with reference to FIGS. 1 to 23, the point cloud transmission device supports spatial scalability decoding. The spatial scalability decoding is decoding performed on all or part of the geometry and/or attributes to provide point cloud content at various resolutions according to decoding performance of a point cloud reception device (e.g., the reception device 10004 of FIG. 1, the point cloud decoder of FIGS. 10 and 11, and the reception device of FIG. 13).

The point cloud data transmission device transmits a bitstream containing the encoded point cloud data (e.g., the bitstream described with reference to FIG. 17) (2420).

Accordingly, the bitstream according to the embodiments (e.g., FIG. 17) contains scalability information (e.g., scalable_lifting_enabled_flag, lifting_scalability_enabled_flag) indicating whether the attribute encoded based on the partial octree structure can be decoded. As described with reference to FIGS. 20 to 23, information for spatial scalability decoding is transmitted through signaling information (e.g., SPS, APS, attribute header, etc.) contained in the bitstream that is described with reference to FIG. 17. As described above, the signaling information (e.g., SPS, APS, attribute header, etc.) in the bitstream (e.g., the bitstream of FIG. 17) may include signaling information indicating whether the attribute decoded based on the partial octree structure at the sequence level or the slice level can be decoded. The receiver may secure such information and perform spatial scalability decoding. Since the operations of the point cloud data transmission device is the same as those described with reference to FIGS. 1 to 23, a detailed description thereof will be skipped.

Figure 25:
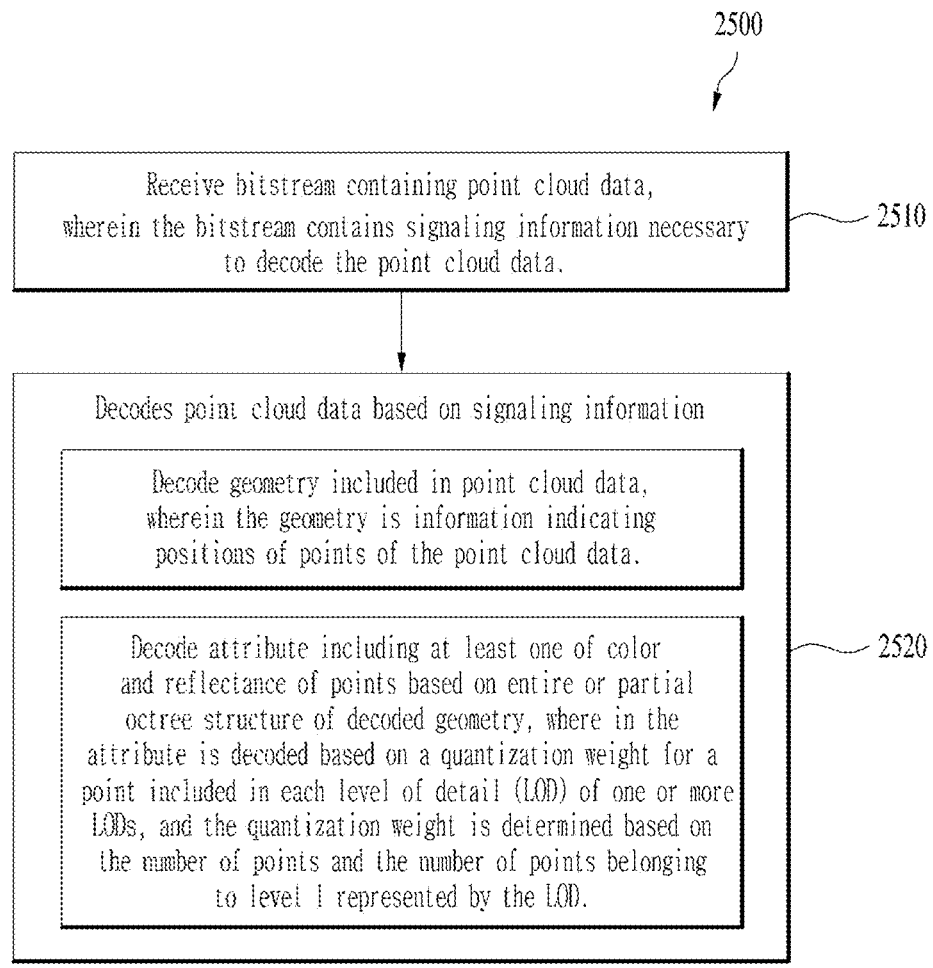
FIG. 25 is a flow diagram of a method of processing point cloud data according to embodiments.

FIG. 25 is a flow diagram of a method of processing point cloud data according to embodiments.

The flow diagram 2500 of FIG. 25 illustrates a method of processing point cloud data by the point cloud data reception device described with reference to FIGS. 1 to 23 (e.g., the reception device 10004 or the point cloud video decoder 10006).

The point cloud data reception device (e.g., the reception device 10004, the receiver of FIG. 13, etc.) receives a bitstream containing point cloud data (2510). The bitstream according to embodiments contains signaling information (e.g., SPS, APS, attribute header, etc.) necessary to decode point cloud data. As described with reference to FIGS. 20 to 23, information for spatial scalability decoding is transmitted through signaling information (e.g., SPS, APS, attribute header, etc.) contained in the bitstream that is described with reference to FIG. 17. As described above, the signaling information (e.g., SPS, APS, attribute header, etc.) in the bitstream may include information related to spatial scalability decoding (or lifting transform) at a sequence level or a slice level.

The point cloud data reception device (e.g., the decoder of FIG. 10) decodes the point cloud data based on the signaling information (2520). The point cloud data reception device (e.g., the geometry decoder of FIG. 10) decodes geometry included in the point cloud data. The geometry according to the embodiments is information indicating positions of points of the point cloud data. The point cloud data reception device (e.g., the attribute decoder of FIG. 10) decodes an attribute including at least one of color and reflectance of the points based on the entire or partial octree structure of the decoded geometry. The attribute is decoded based on a quantization weight (or an improved quantization weight) for a point included in each level of detail (LOD) of one or more LODs. The quantization weight is determined based on the number of points and the number of points belonging to a level l represented by the LOD.

The signaling information necessary to decode the point cloud data further includes scalability information (e.g., scalable_lifting_enabled_flag, or lifting_scalability_enabled_flag) indicating whether the attribute can be decoded based on a partial octree structure. When the scalability information indicates that the attribute can be decoded based on the partial octree structure, the quantization weight is determined for each point included in each LOD from the 0th LOD to the last LOD. The quantization weight calculation process is the same as that described with reference to FIGS. 21 to 23, and thus a detailed description thereof is skipped.

The point cloud data reception device according to the embodiments generates one or more LODs by re-sorting points, performs lifting transform decoding on the attribute based on the one or more LODs, and inversely quantizes the lifting transform decoded attribute based on the quantization weight. As described above with reference to FIG. 22, the quantization weight is determined by executing a program instruction for calculating the quantization weight as stored in a memory included in the point cloud reception device. The point cloud data processing operation of the point cloud data reception device is the same as described with reference to FIGS. 1 to 23, and thus a detailed description thereof will be skipped.

The PCC encoding method, PCC decoding method, and signaling method according to the embodiments of the present document may provide the following effects.

The embodiments may increase the efficiency of attribute compression of geometry-based point cloud compression (G-PCC) for compressing 3D point cloud data. Specifically, a method of selecting an appropriate predictor among predictor candidates may be changed in the G-PCC attribute encoding/decoding process. Thereby, the attribute residual may be affected and the bitstream size may be reduced. Accordingly, a method of configuring an attribute bitstream to increase the efficiency of attribute compression may be provided.

As a result, the embodiments may increase the attribute compression efficiency of an encoder/decoder of Geometry-based Point Cloud Compression (G-PCC) for compressing 3D point cloud data, thereby providing a point cloud content stream that provides fewer bitstreams.

The PCC encoder and/or PCC decoder according to the embodiments may provide an efficient predictor selection method, and reduce the size of a bitstream, thereby increasing attribute compression coding/decoding efficiency.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also non-volatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method of transmitting point cloud data, the method comprising:
encoding the point cloud data including geometry and attribute, the geometry representing positions of points of the point cloud data, the attribute including at least one of colors and reflectance of the points,
wherein encoding the point cloud data includes:
encoding the geometry; and encoding the attribute based on complete or partial octree of the encoded geometry, wherein the attribute is encoded based on weight of an LOD (Level Of Detail) of one or more LODs, wherein the weight is derived based on a number of the points and a number of points that belong to a level that is represented by the LOD; and transmitting a bitstream including the encoded point cloud data wherein the weight is represented as follows:

$$W_{extended\ LoD_l} = \frac{\text{Total point number}}{\text{point number in } LoD_l} = \frac{\text{Total point number}}{\sum_{i=0}^{l} \text{point number in } R_i},$$

$W_{extended\ LoD_l}$ represents the weight, the total point number represents the number of the points, the point number in LOD1 represents a number of points that belong to a level 1 represented by the LOD1, the point number in Ri represents a number of points that only belong to a level i of an LODi, and a value of the point number in LOD1 is equal to a sum of values of the point number in Ri wherein a value of i is in a range of 0 to 1.

2. The method of claim 1, wherein encoding the attribute further includes:

generating the one or more LODs by reorganizing the points;

lifting transform decoding the attribute based on the one or more LODs; and quantization processing the decoded attribute based on the weight.

3. The method of claim 2, wherein the weight is used to decode the encoded attribute based on the partial octree.

4. The method of claim 3, wherein the bitstream includes signaling information indicating whether the encoded attribute is decoded based on the partial octree.

5. A method of processing point cloud data, the method comprising:

receiving a bitstream including the point cloud data, the bitstream including signaling information; and decoding the point cloud data based on the signaling information, decoding the point cloud data including:

decoding geometry included in the point cloud data, the geometry representing positions of points of the point cloud data; and decoding attribute, which includes at least one of colors and reflectance of the points, based on complete or partial octree of the decoded geometry, wherein the attribute is decoded based on weight of an LOD (Level Of Detail) of one or more LODs, wherein the weight is derived based on a total number of the points and a number of all points belonging to the LOD, the all points belonging to the LOD including points from a first LOD to the LOD.

6. The method of claim 5, wherein the signaling information includes scalability information indicating whether lifting transform decoding attribute based on the partial octree is allowed.

7. The method of claim 6, wherein the scalability information indicates whether lifting transform decoding attribute based on the partial octree is allowed, the weight is computed for each point in each LOD from $0^{th}$ LOD to the last LOD.

8. The method of claim 7, wherein decoding attribute includes:

generating the one or more LODs by reorganizing the points;

lifting transform decoding the attribute based on the one or more LODs; and inverse quantization processing the decoded attribute.

9. The method of claim 8, wherein the weight is determined by executing a program instruction for deriving the weight.

10. A device of processing point cloud data, the device comprising:

a receiver to receive a bitstream including the point cloud data, the bitstream including signaling information; and a decoder to decode the point cloud data based on the signaling information, the decoder including:

a geometry decoder configured to decode geometry included in the point cloud data, the geometry representing positions of points of the point cloud data; and an attribute decoder configured to decoded attribute, which includes at least one of colors and reflectance of the points, based on complete or partial octree of the decoded geometry, wherein the attribute is decoded based on weight of an LOD (Level Of Detail) of one or more LODs, wherein the weight is derived based on a total number of the points and a number of all points belonging to the LOD, the all points belonging to the LOD including points from a first LOD to the LOD.

11. The device of claim 10, wherein the signaling information includes scalability information indicating whether lifting transform decoding attribute based on the partial octree is allowed.

12. The device of claim 11, wherein the scalability information indicates whether lifting transform decoding attribute based on the partial octree is allowed, the weight is computed for each point in each LOD from $0^{th}$ LOD to the last LOD.

13. The device of claim 12, wherein the attribute decoder is configured to:

generate the one or more LODs by reorganizing the points;

lifting transform decode the attribute based on the one or more LODs; and inverse quantization process the decoded attribute.

14. The device of claim 13, the device comprising a memory to store a program instruction for deriving the weight.

* * * * *